United States Patent
Onzon et al.

(10) Patent No.: US 10,223,772 B2
(45) Date of Patent: Mar. 5, 2019

(54) METHOD AND SYSTEM FOR DENOISING AND DEMOSAICING ARTIFACT SUPPRESSION IN DIGITAL IMAGES

(71) Applicant: ALGOLUX INC., Montreal (CA)

(72) Inventors: Emmanuel Luc Julien Onzon, Montreal (CA); Nicolas Joseph Paul Robidoux, Montreal (CA)

(73) Assignee: ALGOLUX INC., Montreal (CA)

( * ) Notice: Subject to any disclaimer, the term of this patent is extended or adjusted under 35 U.S.C. 154(b) by 0 days.

(21) Appl. No.: 15/466,639

(22) Filed: Mar. 22, 2017

(65) Prior Publication Data

US 2017/0278224 A1 Sep. 28, 2017

Related U.S. Application Data

(60) Provisional application No. 62/311,612, filed on Mar. 22, 2016.

(51) Int. Cl.
*G06T 5/00* (2006.01)
*G06T 3/40* (2006.01)

(52) U.S. Cl.
CPC ............ *G06T 5/002* (2013.01); *G06T 3/4015* (2013.01); *G06T 2207/20021* (2013.01); *G06T 2207/20028* (2013.01)

(58) Field of Classification Search
CPC ................ G06K 9/0051; G06T 3/4015; G06T 2207/20021; G06T 2207/20028
See application file for complete search history.

(56) References Cited

U.S. PATENT DOCUMENTS

| | | |
|---|---|---|
| 9,122,960 B2 | 9/2015 | Lin et al. |
| 9,251,569 B2 | 2/2016 | Hsieh et al. |
| 9,330,442 B2 | 5/2016 | Kang |
| 9,569,822 B2 | 2/2017 | Hsieh et al. |
| 2012/0281923 A1 | 11/2012 | Irani et al. |
| 2014/0153817 A1 | 6/2014 | Lin et al. |

(Continued)

OTHER PUBLICATIONS

"Fast High-Dimensional Filtering Using the Permutohedral Lattice", Andrew Adams, Jongmin Baek, Myers, Abraham Davis, In Computer Graphics Forum (Proc. Eurographics), 2010.

(Continued)

*Primary Examiner* — Bobbak Safaipour
(74) *Attorney, Agent, or Firm* — IP-Mex Inc.; Victoria Donnelly

(57) ABSTRACT

Methods and systems for denoising a digital image are provided. The method includes determining first and second plurality of pixel patches including respective first (p) and second (q) pixels, determining a patch distance between each pair of corresponding pixel patches in the first plurality and the second plurality of pixel patches, determining an effective distance between the first pixel (p) and the second pixel (q), repeating the above steps for the same first pixel (p) and another second pixel (q) until a predetermined number of pixels (q) in the raw digital image is processed, and then denoising the first pixel (p), including determining respective contributions of the pixels (q) into a noise reduction of the pixel (p), using respective effective distances of the pixels (q). A corresponding system is also provided. Embodiments of the invention provide computational advantages for denoising digital images.

26 Claims, 14 Drawing Sheets

(56) References Cited

U.S. PATENT DOCUMENTS

| | | |
|---|---|---|
| 2015/0071561 A1 | 3/2015 | Hsieh et al. |
| 2016/0117805 A1 | 4/2016 | Hsieh et al. |
| 2016/0253787 A1* | 9/2016 | Chen .................. G06T 5/002 |
| | | 382/275 |

OTHER PUBLICATIONS

"Gaussian KD-Trees for Fast High-Dimensional Filtering", Andrew Adams, Natasha Gelfand, Jennifer Dolson, Marc Levoy. In ACM Transactions on Graphics (Proc. Siggraph 09).

"A review of image denoising algorithms, with a new one", Antoni Buades, Bartomeu Coll, Jean-Michel Morel, SIAM Journal on Multiscale Modeling and Simulation: A SIAM Interdisciplinary Journal, 2005, 4 (2), pp. 490-530.

"A Novel Technique for Reducing Demosaicing Artifacts", Daniele Menon, Stefano Andriani, Giancarlo Calvagno. Prc. of the 14th European Signal Processing Conference (Eusipco), Sep. 2006.

"Flash Photography Enhancement via Intrinsic Relighting", Elmar Eisemann, Fredo Durand, ACM Trans. on Graphics, vil. 23, No. 3, pp. 673-678, Aug. 2004.

"Domain Transform for Edge-Aware Image and Video Processing", Eduardo S. L. Gastal, Manuel M. Oliveira. ACM TOG 30, 4 (2011) 69:1-69:12.

"Digital Photography with Flash and No-Flash Image Pairs", Georg Petschnigg, Richard Szeliski, Maneesh Agrawala, Michael Cohen, Hugues Hoppe, Kentaro Toyama, ACM Trans, on Graphics, vol. 23, No. 3, pp. 664-672, Aug. 2004.

"Real-time Edge-Aware Image Processing with the Bilateral Grid", Jiawen Chen, Sylvain Paris, Fredo Durand. In ACM Transactions on Graphics (Proc. Siggraph 07), p. 103, 2007.

"Rapid Object Detection using a Boosted Cascade of Simple Features", Paul Viola, Michael Jones, Conference on computer vision and pattern recognition, 2001.

"Bilateral Filtering: Theory and Applications", Sylvain Paris, Pierre Kornprobst, Jack Tumblin, Fredo Durand, Foundations and Trends in Computer Graphics and Vision, vol. 4, No. 1, pp. 1-73, 2009.

"Image Demosaicing: A Systematic Survey", Xin Li, Bahadir Gunturk, Lei Zhang, Proc. SPIE 6822, Visual Communications and Image Processing 2008.

"Adaptive manifolds for real-time high-dimensional filtering". ACM TOG 31, 4(2012), 33:1-33:13. Proceedings of SIGGRAPH 2012.

"Anscombe transform" which is published on-line by Wikipedia, https://en.wikipedia.org/w/index.php?title=Anscombe_transform &oldid=542474308, dated Mar. 7, 2016.

"Demosaicing", which is published on-line by Wikipedia, https://en.wikipedia.org/w/index.php?title=Demosaicing&oldid= 698668356, dated Jan. 7, 2016.

"Summed area table", which is published on-line by Wikipedia, https://en.wikipedia.org/w/index.php?title=Summed_area_table &oldid=705056397, dated Feb. 15, 2016.

"Bayer filter", which is published on-line by Wikipedia, https://en.wikipedia.org/w/index.php?title=Bayer_filter&oldid=706429574, dated Feb. 23, 2016.

"Bilateral Filter", which is published on-line by Wikipedia, https://en.wikipedia.org/w/index.php?title=Bilateral_filter&oldid= 709887363, dated Mar. 13, 2016.

"Raw image format", which is published on-line by Wikipedia, https://en.wikipedia.org/w/index.php?title=Raw_image_format&oldid= 711143770, dated Mar. 21, 2016.

"Non-local Means", which is published on-line by Wikipedia, https://en.wikipedia.org/w/index_php?title=Non-local_means&oldid= 709366809, dated Mar. 10, 2016.

* cited by examiner

| R  | G1    | R     | G1    | R  | G1    | R     | G1    |
|----|-------|-------|-------|----|-------|-------|-------|
| G2 | B p1  | G2 p2 | B p3  | G2 | B     | G2    | B     |
| R  | G1 p4 | R p   | G1 p5 | R  | G1    | R     | G1    |
| G2 | B p6  | G2 p7 | B p8  | G2 | B q1  | G2 q2 | B q3  |
| R  | G1    | R     | G1    | R  | G1 q4 | R q   | G1 q5 |
| G2 | B     | G2    | B     | G2 | B q6  | G2 q7 | B q8  |

FIG. 3A1

| R | G1 | R | G1 | R | G1 | R | G1 |
|---|---|---|---|---|---|---|---|
| G2 | B p1 | G2 p2 | B p3 | G2 | B | G2 | B |
| R | G1 p4 | R p | G1 p5 | R | G1 | R | G1 |
| G2 | B p6 | G2 p7 | B p8 | G2 | B q1 | G2 q2 | B q3 |
| R | G1 | R | G1 | R | G1 q4 | R q | G1 q5 |
| G2 | B | G2 | B | G2 | B q6 | G2 q7 | B q8 |

FIG. 3C1

| R  | G1    | R     | G1    | R  | G1    | R     | G1    |
|----|-------|-------|-------|----|-------|-------|-------|
| G2 | B p1  | G2 p2 | B p3  | G2 | B     | G2    | B     |
| R  | G1 p4 | R p   | G1 p5 | R  | G1    | R     | G1    |
| G2 | B p6  | G2 p7 | B p8  | G2 | B q1  | G2 q2 | B q3  |
| R  | G1    | R     | G1    | R  | G1 q4 | R q   | G1 q5 |
| G2 | B     | G2    | B     | G2 | B q6  | G2 q7 | B q8  |

FIG. 3C2

| R | G1 | R | G1 | R | G1 | R | G1 |
|---|---|---|---|---|---|---|---|
| G2 | B p1 | G2 p2 | B p3 | G2 | B | G2 | B |
| R | G1 p4 | R p | G1 p5 | R | G1 | R | G1 |
| G2 | B p6 | G2 p7 | B p8 | G2 | B q1 | G2 q2 | B q3 |
| R | G1 | R | G1 | R | G1 q4 | R q | G1 q5 |
| G2 | B | G2 | B | G2 | B q6 | G2 q7 | B q8 |

FIG. 3C3

| R | G1 | R | G1 | R | G1 | R | G1 |
|---|---|---|---|---|---|---|---|
| G2 | B p1 | G2 p2 | B p3 | G2 | B | G2 | B |
| R | G1 p4 | R p | G1 p5 | R | G1 | R | G1 |
| G2 | B p6 | G2 p7 | B p8 | G2 | B q1 | G2 q2 | B q3 |
| R | G1 | R | G1 | R | G1 q4 | R q | G1 q5 |
| G2 | B | G2 | B | G2 | B q6 | G2 q7 | B q8 |

METHOD AND SYSTEM FOR DENOISING AND DEMOSAICING ARTIFACT SUPPRESSION IN DIGITAL IMAGES

FIELD OF THE INVENTION

The present invention generally relates to image processing of digital images, and in particular to a method and system for denoising and demosaicing raw digital images.

BACKGROUND OF THE INVENTION

Digital images may become noisy during acquisition or transmission, resulting in the reduced quality of the digital images.

Reducing the noise, or denoising, of the digital image still remains a challenge, because noise reduction introduces artifacts and causes blurring of digital images.

There are various existing denoising techniques, each having its assumptions, advantages, and limitations, and being suitable to particular noise model.

Accordingly, there is a need in the industry for developing an alternative method and system for denoising digital images, which would mitigate or avoid at least some shortcomings of the prior art.

Also, because digital images are acquired by an image sensor overlaid with a color filter array (CFA), for example a Bayer's filter, a demosaicing process is needed to remove demosaic artifacts resulting from the CFA structure of sensors, to render the digital images into a viewable format. Demosaicing process is also known as CFA interpolation or color reconstruction. Modern digital cameras can save digital images in a raw format to obtain raw images, allowing users to demosaic raw images using software, instead of using a firmware built-in the digital camera.

Usually, demosaicing methods cause several artifacts such as zipper effect and color artifact which are easily seen around edges and densely textured regions, and typically new demosaicing methods are proposed to remove or mitigate these artifacts. A survey in "*Image Demosaicing: A Systematic Survey*," X. Li, B. Gunturk, L. Zhang., Proc. SPIE 6822, Visual Communications and Image Processing 2008, provides a review of demosaicing methods.

Accordingly, there is a need in the industry for developing an alternative method and system for suppressing artifacts in digital images introduced by existing demosaicing methods, which would mitigate or avoid at least the shortcomings of the prior art.

SUMMARY OF THE INVENTION

There is an object of the present invention to provide an improved method and system for denoising and demosaic artifact suppression of digital images, which would mitigate or avoid at least some disadvantages of the prior art.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for denoising a raw digital image, including: employing a hardware processor to perform: (a) selecting a first pixel (p) of the raw digital image; (b) selecting a second pixel (q) of the raw digital image; (c) determining a first plurality of pixel patches, each pixel patch in the first plurality of pixel having a predetermined pixel patch shape and a predetermined pixel patch size and containing the first pixel (p); (d) determining a second plurality of pixel patches, each pixel patch in the second plurality containing the second pixel (q), and corresponding in shape and size to a respective pixel patch of the first plurality; (e) determining a patch distance between each pair of corresponding pixel patches in the first plurality and the second plurality of pixel patches; (f) determining an effective distance between the first pixel (p) and the second pixel (q) based on determined patch distances for all pairs of corresponding pixel patches in the first plurality and the second plurality of pixel patches; (g) repeating the steps (a) to (f) for the same first pixel (p) and another second pixel (q) until a predetermined number of pixels (q) in the raw digital image is processed; and (h) denoising the first pixel (p), including determining respective contributions of the pixels (q) into a noise reduction of the pixel (p), using respective effective distances of the pixels (q). Other embodiments of this aspect include corresponding computer systems, apparatus, and computer programs recorded on one or more computer storage devices, each configured to perform the actions of the methods.

Implementations of the method may include one or more of the following features. The method including repeating the steps (a) to (h) for other first pixels (p) until a predetermined number of pixels (p) in the raw digital image is processed, thereby obtaining a denoised raw digital image. The method where: the predetermined number of pixels (q) includes all pixels (q) in the raw digital image outside of the first plurality of pixel patches; and the predetermined number of pixels (p) includes all pixels (p) in the raw digital image outside of the second plurality of pixel patches. The method where the predetermined pixel patch shape is one of the following: a square; a rectangle; a circle; an oval; a hexagon; an octagon; or a polygon. The method where the predetermined pixel patch shape is a square, and a predetermined pixel patch size is from 2×2 pixels to 3×3 pixels. The method where the predetermined pixel patch shape is a square, and a predetermined pixel patch size is from about 2×2 pixels to about 8×8 pixels. The method where the predetermined pixel patch shape is a square, and a predetermined pixel patch size is from about 5×5 pixels to about 16×16 pixels. The method where the step (f) includes determining the effective distance as an average patch distance among all patch distances. The method where the step (f) includes determining the effective distance as a maximum patch distance among all patch distances. The method where the denoising includes applying one of: a non-local means method; or a bilateral filter method. The method where: the predetermined shape of the pixel patch is a rectangle; a neighborhood of pixels surrounding the pixel (p) used for denoising the pixel (p) has a rectangular shape; and the denoising comprising applying an integral images method. The method where the raw digital image is a Bayer's pattern image. The method where the steps (a) and (b) include selecting the first and second pixels of a same type. The method further including removing high frequency artifacts from the first pixel (p), including: determining an average for each pixel patch in the first plurality of pixels; forming a multi-dimensional guide for the first pixel (p), including the average for the pixel patches as components of the multi-dimensional guide; and applying a bilateral filter method with the multi-dimensional guide to the first pixel (p), thereby removing the high frequency artifacts. The system where the instructions cause the processor to repeat the steps (a) to (h) for other first pixels (p) until a predetermined number of pixels (p) in the raw digital image is processed, thereby obtaining a denoised raw digital image. The system where: the predetermined number of pixels (q) includes all pixels (q) in the raw digital image outside of the first plurality of pixel patches; and the predetermined number of pixels (p) includes all pixels (p) in the raw digital image outside of the second plurality of pixel patches. The system where the predetermined pixel patch shape is one of the following: a square; a rectangle; a circle; an oval; a hexagon; an octagon; or a polygon. The system where the predetermined pixel patch shape is a square, and a predetermined pixel patch size is from 2×2 pixels to 3×3 pixels. The system where the predetermined pixel patch shape is a square, and a predetermined pixel patch size is from about 2×2 pixels to about 8×8 pixels. The system where the predetermined pixel patch shape is a square, and a predetermined pixel patch size is from about 5×5 pixels to about 16×16 pixels. The system where the step (f) includes determining the effective distance as an average patch distance among all patch distances. The system where the step (f) includes determining the effective distance as a maximum patch distance among all patch distances. The system where the instructions cause the processor to apply one of: a non-local means method; or a bilateral filter method, to denoise the first pixel (p). The system where: the predetermined shape of the pixel patch is a rectangle; a neighborhood of pixels surrounding the pixel (p) used for denoising the pixel (p) has a rectangular shape; and the denoising comprising applying an integral images method. The system where the raw digital image is a Bayer's pattern image. The system where the instructions cause the processor to select the first and second pixels of a same type in steps (a) and (b). The system the instructions further cause the processor to remove high frequency artifacts from the first pixel (p), the instructions cause the processor to: determine an average for each pixel patch in the first plurality of pixels; form a multi-dimensional guide for the first pixel (p), including the average for the pixel patches as components of the multi-dimensional guide; and apply a bilateral filter method with the multi-dimensional guide to the first pixel (p), thereby removing the high frequency artifacts. Implementations of the described techniques may include hardware, a method or process, or computer software on a computer-accessible medium.

Another general aspect includes a system for denoising a raw digital image, including: a processor and a non-transitory computer readable storage medium having computer readable instructions stored thereon for execution by the processor, causing the processor to: (a) select a first pixel (p) of the raw digital image; (b) select a second pixel (q) of the raw digital image; (c) determine a first plurality of pixel patches, each pixel patch in the first plurality of pixels having a predetermined pixel patch shape and a predetermined pixel patch size and containing the first pixel (p); (d) determine a second plurality of pixel patches, each pixel patch in the second plurality containing the second pixel (q), and corresponding in shape and size to a respective pixel patch of the first plurality; (e) determine a patch distance between each pair of corresponding pixel patches in the first plurality and the second plurality of pixel patches; (f) determine an effective distance between the first pixel (p) and the second pixel (q) based on determined patch distances for all pairs of corresponding pixel patches in the first plurality and the second plurality of pixel patches; (g) repeat the steps (a) to (f) for the same first pixel (p) and another second pixel (q) until a predetermined number of pixels (q) in the raw digital image is processed; and (h) denoise the first pixel (p), including determining respective contributions of the pixels (q) into a noise reduction of the pixel (p), using respective effective distances of the pixels (q). Other embodiments of this aspect include corresponding computer systems, apparatus, and computer programs recorded on one or more computer storage devices, each configured to perform the actions of the methods.

Implementations of the system may include one or more of the following features. The system where the instructions cause the processor to repeat the steps (a) to (h) for other first pixels (p) until a predetermined number of pixels (p) in the raw digital image is processed, thereby obtaining a denoised raw digital image. The system where: the predetermined number of pixels (q) includes all pixels (q) in the raw digital image outside of the first plurality of pixel patches; and the predetermined number of pixels (p) includes all pixels (p) in the raw digital image outside of the second plurality of pixel patches. The system where the predetermined pixel patch shape is one of the following: a square; a rectangle; a circle; an oval; a hexagon; an octagon; or a polygon. The system where the predetermined pixel patch shape is a square, and a predetermined pixel patch size is from 2×2 pixels to 3×3 pixels. The system where the predetermined pixel patch shape is a square, and a predetermined pixel patch size is from about 2×2 pixels to about 8×8 pixels. The system where the predetermined pixel patch shape is a square, and a predetermined pixel patch size is from about 5×5 pixels to about 16×16 pixels. The system where the step (f) includes determining the effective distance as an average patch distance among all patch distances. The system where the step (f) includes determining the effective distance as a maximum patch distance among all patch distances. The system where the instructions cause the processor to apply one of: a non-local means method; or a bilateral filter method, to denoise the first pixel (p). The system where: the predetermined shape of the pixel patch is a square; and the denoising including applying an integral images method. The system where the raw digital image is a Bayer's pattern image. The system where the instructions cause the processor to select the first and second pixels of a same type in steps (a) and (b). The system the instructions further cause the processor to remove high frequency artifacts from the first pixel (p), the instructions cause the processor to: determine an average for each pixel patch in the first plurality of pixels; form a multi-dimensional guide for the first pixel (p), including the average for the pixel patches as components of the multi-dimensional guide; and apply a bilateral filter method with the multi-dimensional guide to the first pixel (p), thereby removing the high frequency artifacts. Implementations of the described techniques may include hardware, a method or process, or computer software on a computer-accessible medium.

Denoising

According to one embodiment of the invention, a method and system for denoising digital images are provided, where a Non-Local Means filter is modified to take into account a color filter pattern of an image sensor. In particular, only pixels of the same color are averaged together and processed by the Non-Local Means filter. In an embodiment of the invention, the color filter array is a Bayer's filter. A repetitive pattern of the Bayer's filter is taken into account, and the Non-Local Means method is modified to search only for every other row and every other column when matching neighborhoods of pixels, thus processing only pixels of the same color. As a result, the quality of denoising has been improved.

Demosaic Artifact Suppression

According to another embodiment of the present invention, a method is provided that is used as a post processing of the demosaiced image. In contrast to the prior art methods, where usually an edge detection is explicitly performed, the method of the another embodiment of the present invention performs an image restoration without any explicit edge detection. The method of the another embodiment of the present invention attenuates or removes demosaic artifacts that appear as repetitive patterns known as zipper artifacts, however it is not applicable to removing color artifacts, introduced by some demosaicers.

The method applies the cross bilateral filter with improved guide on the RGB image, where the improved guide of the cross bilateral filter is carefully chosen to take advantage of the regular patterns typically seen in demosaicing artifacts. The cross bilateral filter, also known as joint bilateral filter, has been described in "*Flash Photography Enhancement Via Intrinsic Relighting*," E. Eisemann and F. Durand, ACM Trans. on Graphics, vol. 23, no. 3, pp. 673-678, August 2004 and "*Digital Photography With Flash And No-Flash Image Pairs*," G. Petschnigg, R. Szeliski, M. Agrawala, M. Cohen, H. Hoppe, and K. Toyama, ACM Trans. on Graphics, vol. 23, no. 3, pp. 664-672, August 2004, and a detailed description of the bilateral filter and its extensions is provided in "*Bilateral Filtering: Theory And Applications*," S. Paris, P. Kornprobst, J. Tumblin, and F. Durand, Foundations and Trends in Computer Graphics and Vision, vol. 4, no. 1, pp. 1-75, 2009.

The guide that is used in cross bilateral filter, for performing demosaic artifact suppression, is a 4 channel image, which can also be seen as a function that maps each pixel of the digital image to a 4 dimensional vector. The guide is computed during the filtering process, or precomputed before filtering, as follows. For each pixel p we consider the 4 blocks of 2 by 2 pixels that contain a pixel of interest p. We compute the average luminance on each of those 2×2 blocks to get a four dimensional feature vector corresponding to the pixel p. The 4-dimensional vector gives 4 values for the guide corresponding to the pixel p.

The effect of cross bilateral filtering is to make intensities of two pixels p and q more similar if their corresponding four dimensional feature vectors in the guide are similar, and p and q are spatially close enough.

In the embodiments of the present invention, the improved guide based on the four dimensional feature vector is used in the cross bilateral filter, for performing artifact suppression on the demosaiced image. Thus, an improved cross bilateral filter having an improved guide of the embodiment of the present invention, has been provided.

In an area where the demosaiced image should be uniform, many demosaicers typically produce a non-uniform image, for example, the demosaiced image exhibits repetitive patterns where two neighboring blocks of 2×2 pixels are symmetric with respect to one another.

In particular, neighboring blocks of 2×2 pixels have approximately the same mean intensity, when the underlying true image is actually uniform. The same considerations also apply for an area of the demosaiced image where there is an edge with a slope that is approximately a multiple of 45 degrees. Two 2×2 pixel blocks that are neighbors along the direction of the edge have approximately the same mean intensities. While the average of the 2×2 pixel blocks are similar, pixel values are not, because of the zipper artifact, even though they should similar.

The cross bilateral filter takes the advantage of the similarity of the average luminance of the 2×2 pixel blocks, to make those pixels more similar.

Thus, improved methods and system for denoising and demosaic artifact suppression in digital images have been provided.

BRIEF DESCRIPTION OF THE DRAWINGS

Embodiments of the invention will now be described, by way of example, with reference to the accompanying drawings, in which:

FIG. 3A1 illustrates pixel patches for Non-Local Means Filter of the embodiment of the invention;

FIG. 3C1 shows a first example containing pixels (p) and (q);

FIG. 3C2 shows a second example containing pixels (p) and (q);

FIG. 3C3 shows a third example containing pixels (p) and (q);

FIG. 3C4 shows a fourth example containing pixels (p) and (q);

FIG. 4 illustrates a system for demosaic artifact suppression in digital images according to yet another embodiment of the invention;

FIG. 5A1 illustrates a table having an example for determining an average luminance $L1p$ of the pixel p, according to an embodiment of the present invention;

FIG. 5A2 illustrates a table having an example for determining an average luminance $L2p$ of the pixel p, according to an embodiment of the present invention;

FIG. 5A3 illustrates a table having an example for determining an average luminance $L3p$ of the pixel p, according to an embodiment of the present invention;

FIG. 5A4 illustrates a table having an example for determining an average luminance $L4p$ of the pixel p, according to an embodiment of the present invention.

DESCRIPTION OF EMBODIMENTS OF THE INVENTION

Glossary

Figure 1:
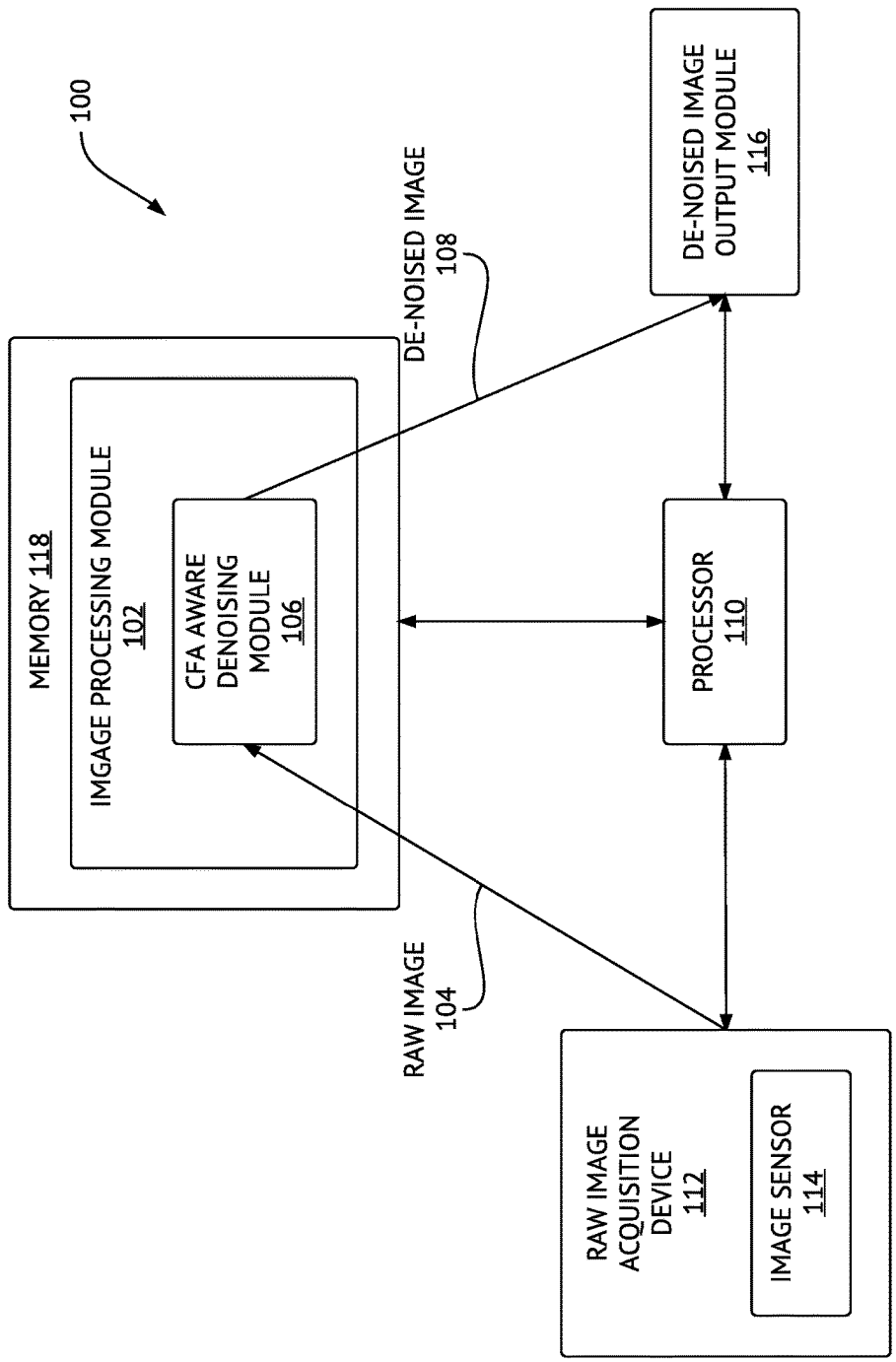
FIG. 1 illustrates a system for denoising of digital images according to an embodiment of the invention.

Bayer Filter Mosaic: a color filter array (CFA) for arranging RGB color filters on a square grid of photo sensors. Bayer Filter Mosaic is described in an article titled "Bayer filter", which is published on-line by Wikipedia, downloaded 16 Mar. 2017, and which is submitted in the information disclosure statement for the present application, the entire contents of the article being incorporated herein by reference.

Bilateral Filter: a non-linear, edge-preserving and noise-reducing smoothing filter for images. The intensity value at each pixel in an image is replaced by a weighted average of intensity values from nearby pixels. Bilateral Filters are described in an article titled "Bilateral Filter", which is published on-line by Wikipedia, downloaded 16 Mar. 2017, and which is submitted in the information disclosure statement for the present application, the entire contents of the article being incorporated herein by reference.

Non-local Means: an algorithm in image processing for image denoising. Unlike "local mean" filters, which take the mean value of a group of pixels surrounding a target pixel to smooth the image, non-local means filtering takes a mean of all pixels in the image, weighted by how similar these pixels are to the target pixel. Non-local Means is described in an article titled "Non-local Means", which is published on-line by Wikipedia, downloaded 16 Mar. 2017, and which is submitted in the information disclosure statement for the present application, the entire contents of the article being incorporated herein by reference.

Raw Image: a file that contains minimally processed data from the image sensor of either a digital camera, image scanner, or motion picture film scanner. Raw Images are described in an article titled "Raw image format", which is published on-line by Wikipedia, downloaded 16 Mar. 2017, and which is submitted in the information disclosure statement for the present application, the entire contents of the article being incorporated herein by reference.

Integral Image (also known as a summed area table): a data structure and algorithm for quickly and efficiently generating the sum of values in a rectangular subset of a grid. Integral Images are described in an article titled "Summed area table", which is published on-line by Wikipedia, downloaded 16 Mar. 2017, and which is submitted in the information disclosure statement for the present application, the entire contents of the article being incorporated herein by reference.

Demosaicing (also referred to as de-mosaicing, demosaicking or debayering) algorithm: a digital image process used to reconstruct a full color image from the incomplete color samples output from an image sensor overlaid with a color filter array (CFA). It is also known as CFA interpolation or color reconstruction. Demosaicing is described in an article titled "Demosaicing", which is published on-line by Wikipedia, downloaded 16 Mar. 2017, and which is submitted in the information disclosure statement for the present application, the entire contents of the article being incorporated herein by reference.

Anscombe Transform: a variance-stabilizing transformation that transforms a random variable with a Poisson distribution into one with an approximately standard Gaussian distribution. The Anscombe Transform is described in an article titled "Anscombe Transform", which is published on-line by Wikipedia, downloaded 16 Mar. 2017, and which is submitted in the information disclosure statement for the present application, the entire contents of the article being incorporated herein by reference.

Neighborhood of pixel p N(p): Set of pixels surrounding pixel p which values are used to denoise pixel p.

Patch diameter or radius M: This measures the span in pixels, in each dimension, of the patches that are considered around each pixels to compute the weights in the averaging formulas. In section 1, M is the radius of the patch, i.e. a patch is a square of (2M+1)×(2M+1) pixels, while in section 2 M is the diameter of the patch, i.e. a patch is a square of M×M pixels.

Patch kernel: The subscript p stands for "patch", it is not related to pixel p. That function can weight pixels in the patch differently depending on their positions within the patch. It allows for example to have disc shaped patches. It can also be used to give less weights to pixels that are more distant to the centre of the patch, for instance by using a Gaussian kernel.

Patch distance between pixels p and q: This is a similarity measure between the pixels surrounding p and the pixels surrounding q (including pixels p and q). It does not satisfy the mathematical definition of a distance, but with a slight abuse of terminology we still call it a distance.

Neighborhood half radius K: This measures the size of the neighborhood N(p), which is a square of (4k+1)×(4k+1) pixels.

"h": The physical meaning of "h" is denoising strength. It is a positive value. The higher it is the stronger the denoising is, meaning more noise is removed at the risk of losing some details, and conversely the lower it is the more details are preserved, at the risk of letting still some remaining noise or possibly creating some artifacts.

"$\rho$": the strength of a high frequency artifact removal filter (which is comparable to h, the strength of the denoiser). The larger it is the more effective it is to remove noise. If it is set to a high value then fine details may disappear.

1.0 Denoising of Digital Images

A system 100 for denoising of digital images of an embodiment of the invention is shown in FIG. 1. The system 100 comprises a Raw Image Acquisition Device 20, for example a digital camera, image scanner or motion picture film scanner comprising an image sensor device 114 such as CCD (charge coupled device) or CMOS (complementary metal oxide semiconductor) image sensor, for acquiring a raw image 13. The raw image 104 contains minimally processed data from the image sensor 21, in a raw image format.

The acquired raw image 104 is supplied to an Image Processing Module 102 comprising a CFA (color filter array) Pattern Aware Denoising Module 106 for processing the raw image 104 into a denoised image 108. The CFA Pattern Aware Denoising Module 106 takes into account the structure/pattern of the CFA filter. In a preferred embodiment of the invention, the CFA is a Bayer's filter having a Bayer's pattern. The description of embodiments herein is formulated for Bayer CFA but it is equally applicable for any arbitrary CFA, for example Red-Green-Blue-Infrared or Red-Clear-Clear-Green.

The Image Processing Module 102 and CFA Pattern Aware Denoising Module 106 are stored in a non-transitory computer readable memory device 118 and comprise computer executable instructions stored in the memory device 118 for execution by a hardware processor 110. The CFA Pattern Aware Denoising Module 106 outputs the denoised image 108 through a Denoised Image Output Module 116 which contains computer readable instructions stored in a memory (not shown) and is responsible for storage or further processing of the denoised image 108 or transmission of the denoised image 108 over a network.

Figure 2:
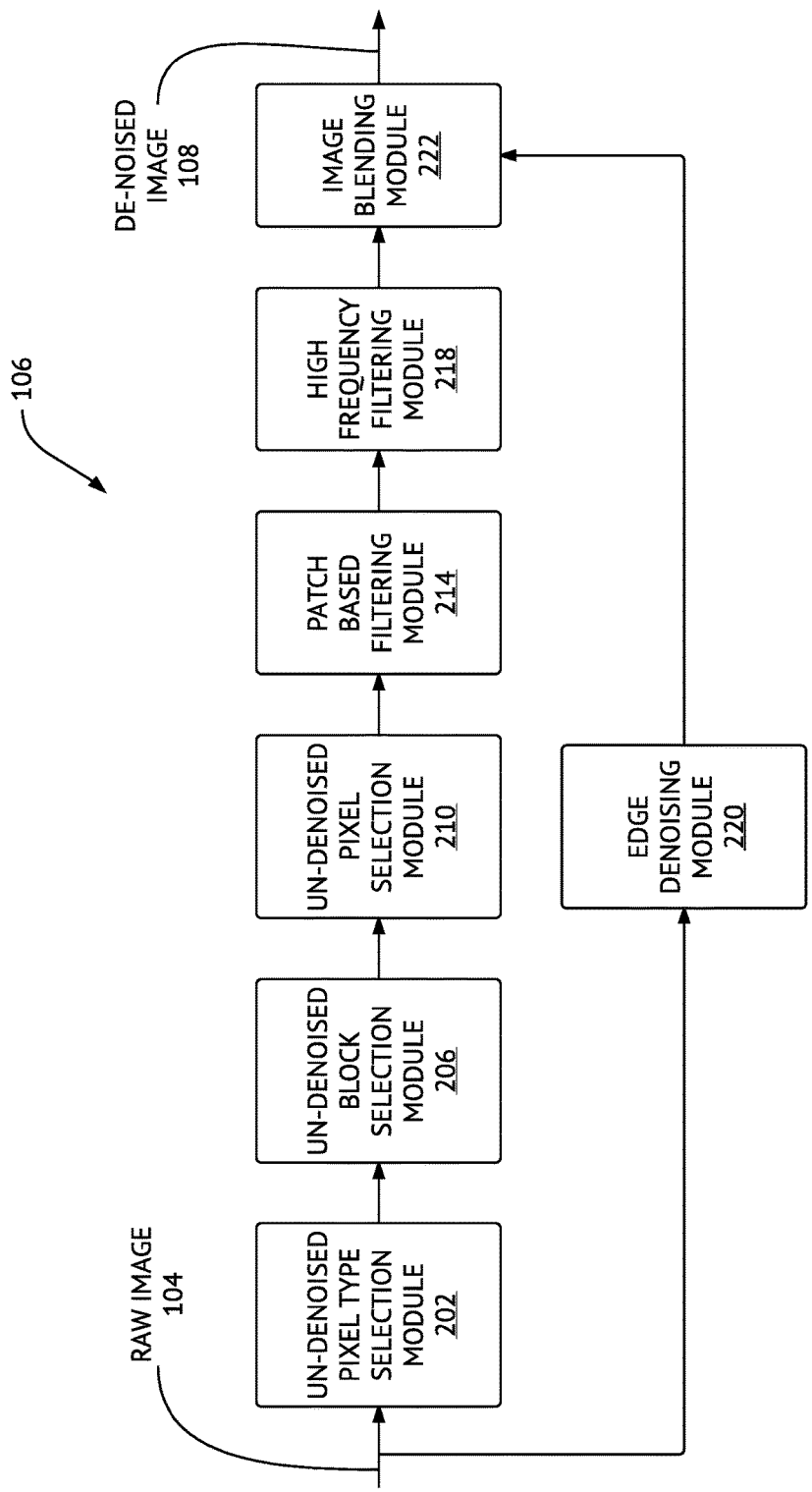
FIG. 2 illustrates a color filter array (CFA) Pattern Aware Denoising module of FIG. 1 in more detail.

FIG. 2 shows the CFA Pattern Aware Denoising Module 106 of FIG. 1 in more detail.

In the embodiment of the invention, the CFA is a Bayer's filter. The CFA Pattern Aware Denoising Module 106 comprises an Undenoised Pixel Type Selection Module 202 for selecting a respective pixel type (such as Red, Green, Blue);

an Undenoised Block Selection Module 206 for selecting 2×2 blocks of pixels containing a pixel "p" of interest; an Undenoised Pixel Selection Module 210 for selecting pixels to be denoised; and a Modified Patch Based Filtering Module 214 for applying a modified Non-Local Means (NLM) filter of the embodiment of the invention, or a patch based filter, or a bilateral filter, for denoising the pixel "p" of interest. The Pattern Aware Denoising Module 106 preferably includes a High Frequency Filtering Module 218 which is described in detail herein below. The Pattern Aware Denoising Module 106 also preferably includes an edge denoising module 220 which is described in detail herein below. The Pattern Aware Denoising Module 106 also preferably includes an image blending module 222 which is described in detail herein below.

It is understood that other types of CFA are also possible, and the NLM filter may be generally substituted by a patch based filter or a bilateral filter suitable for processing a raw image obtained according to a respective CFA.

The Undenoised Pixel Type Selection Module 202, the Undenoised Block Selection Module 206, the Undenoised Pixel Selection Module 210, and the Modified Patch Based Filtering Module 214 comprise computer readable instructions stored in a memory for execution by the hardware processor 110.

Figure 3A:
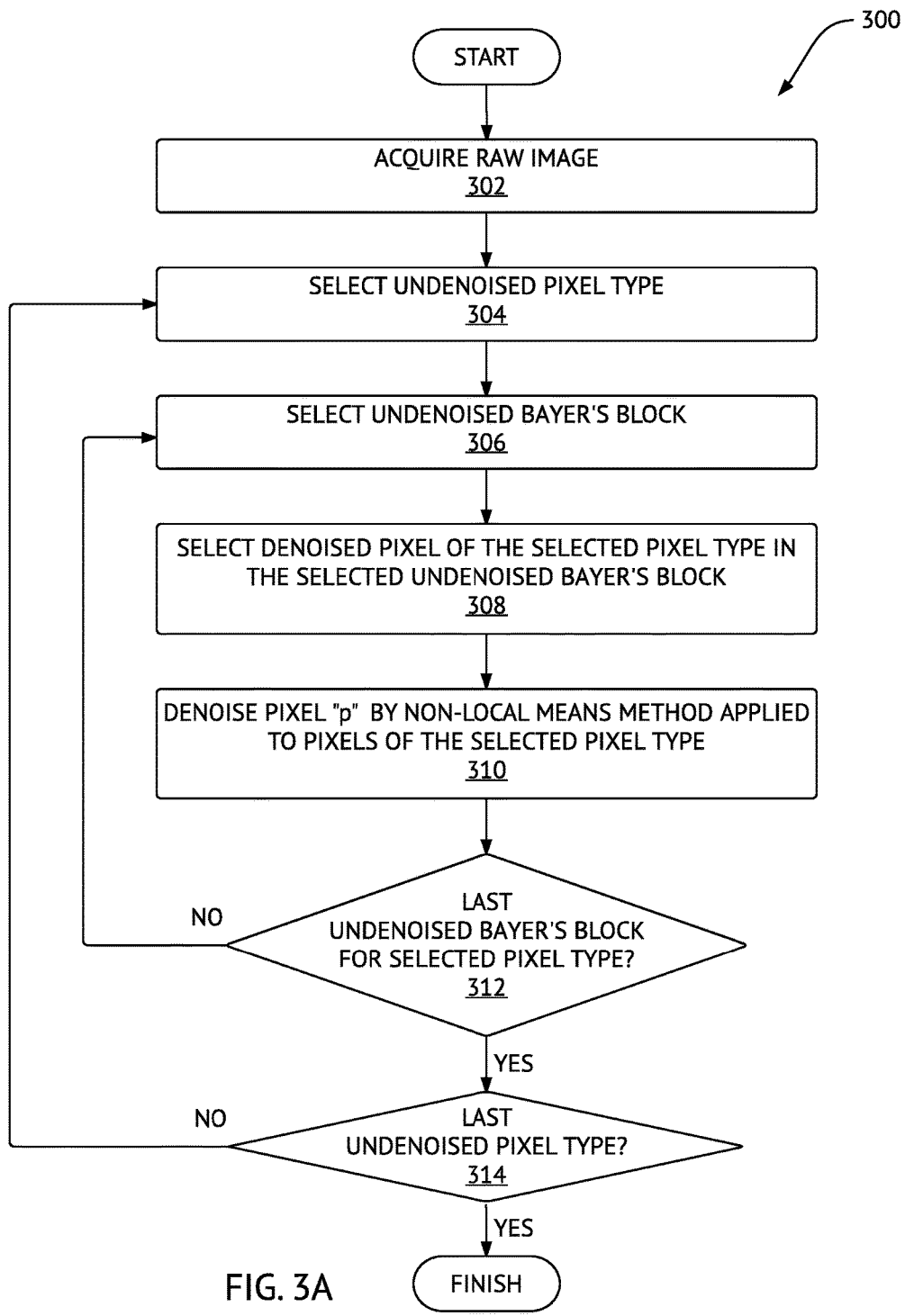
FIG. 3A shows a flowchart illustrating a method for denoising of digital images according to an embodiment of the present invention.

The method for denoising of digital images of the embodiment of the invention is illustrated by a flowchart 300 of FIG. 3A.

Upon acquisition of the raw image 104 by the Raw Image Acquisition Device 112 (box 302), the method selects undenoised pixel type, which has not been processed yet (box 304). For Bayer's pattern, the pixel type is (R, G1, G2, B), where R=red, G1=green1, G2=green2, and B=blue.

An example of the above method follows. For simplicity, it is assumed that the first pixel type that has been selected is R.

Next, an undenoised Bayer's block of 2×2 pixels is selected, which has not been processed yet (box 306), followed by selection (box 308) of undenoised pixel ("p") of the selected pixel type (for example R) in the selected undenoised Bayer's block of 2×2 pixels.

Next, the selected pixel "p" is denoised by using a Non-Local Means filter or another patch based filter or bilateral filter (box 310), which is applied only to the pixels of the selected pixel type (for example only to pixels R). This means searching for neighboring pixels "q" of the selected pixel type only. However, even though "p" and "q" are of the same type, when computing distance between their respective patches, we include all pixels of the two patches, regardless of their types. Since "p" and "q" are of the same type, when taking the difference of the two patches, only differences between pixels of the same types are performed. For instance suppose pixel "p" is of type R, Bayer's pattern alignment is RGGB and we consider 3×3 patches surrounding the pixel of interest. Then for both "p" and "q" the types of the pixels of their respective patches are the same, as can be seen in FIG. 3A1.

The distance between the two patches would be:

$$d(p,q)^2 = (I(p_1)-I(q_1))^2+(I(p_2)-I(q_2))^2+(I(p_3)-I(q_3))^2+(I(p_4)-I(q_4))^2+(I(p_5)-I(q_5))^2+(I(p_6)-I(q_6))^2+(I(p_7)-I(q_7))^2+(I(p_8)-I(q_8))^2+(I(p)-I(q))^2$$

Then, the next pixel of the same selected pixel type is selected in the next Bayer's block (box 312). If the next Bayer's block is not the last undenoised Bayer's block for the selected pixel type (exit "No" from box 312), the method returns to box 306 for selecting the next Bayer's block for processing, containing the next pixel of the selected pixel type.

Otherwise, if the next Bayer's block is the last undenoised Bayer's block for the selected pixel type (exit "Yes" from box 302), the method proceeds to checking if all pixel types have been processed (box 304).

Provided the pixel type is not the last undenoised pixel type (exit "No" from box 304), i.e. there are other remaining pixel types available for processing, the method returns to box 304 for selected the next undenoised pixel type, for example, G1, G2 or B.

Otherwise, provided the pixel type is the last undenoised pixel type (exit "Yes" from box 304), the method outputs a denoised image 108, through the Denoised Image Output Module 116, and the method is terminated.

1.1 Method for Denoising of Digital Images

The method and system for denoising of digital images of the embodiment of the present invention is suitable for digital images which have a repetitive spatial structure, for CFA pattern in raw digital images.

As an example, we describe a method for performing denoising directly on a raw image having a Bayer's pattern. The method for denoising of the embodiment of the invention is an adaptation of the Non Local Means (NLM) method for a raw image.

A raw image with Bayer's pattern comprises blocks of 2 by 2 pixels. Two of these pixels record the intensity of the green light, and the remaining two pixels record the intensity of red and blue light.

This means that using the prior art NLM method on a raw image would not make sense because intensity values of lights of different colors would be averaged together.

In the present application, the NLM algorithm has been modified to take into account the Bayer pattern. One way of doing this is to search only every other row and every other column when matching the pixel patches.

Let I be the raw noisy image and Î be the resulting image after denoising, for each pixel p, $$\hat{I}(p) = \frac{1}{C(p)} \sum_{x=-k}^{k} \sum_{y=-k}^{k} I(p+2(x,y))\omega(p, p+2(x,y)).$$

In the embodiment of the invention, the difference with the prior art NLM algorithm is that we skip odd columns and odd rows, with respect to the pixel of interest P, when we use the factor 2 in front of (x,y) in the equation above.

The parameters in the above noted equation are defined as follows, i.e.

when $$p \neq q, \omega(p,q) = \exp\left(-\frac{d(p,q)^2}{h^2}\right),$$

or the variation $$\omega(p,q) = \exp\left(-\frac{\max(0, d(p,q)^2 - 2\sigma^2)}{h^2}\right),$$

when $$p = q, \omega(p, p) = \max_{q \in B(p), q \neq p} \omega(p, q),$$

with $$B(p) = \{p + 2(x, y) \mid -k \leq x, y \leq k\},$$

$$C(p) = \sum_{x=-k}^{k} \sum_{y=-k}^{k} \omega(p, 2(x, y)),$$

$$d(p, q)^2 = \sum_{x=-M}^{M} \sum_{y=-M}^{M} K_p(x, y)(I(p + (x, y)) - I(q + (x, y)))^2$$

$K_p$ is a positive weighting kernel that puts a different weight on each pixel of the patch. It can be chosen uniform, such as K≡1, or decreasing with distance from the pixel at the center of the neighborhood (for instance a Gaussian kernel).

M and k are small integers (typically M∈{1, . . . , 4} and k∈{1, . . . , 12}), h is a real number. Those constants are chosen depending on the prevalence of the noise in the image, the stronger the noise, the higher they are. The constant σ is the standard deviation of the noise in case the noise can be assumed to have uniform standard deviation across the image.

2.0 Texture Preserving Denoising

We now describe another embodiment of the raw image denoiser. The difference with the original algorithm is in the way we compute the distance d(p,q) between the patch of the pixel to be denoised p and the patches of its neighboring pixels $$q \in N(p) = \varphi + 2(i,j); \ i,j \in \{-K, \ldots, K\}$$

where integer K is a parameter (the neighborhood radius). That new way of computing the distance between patches allows better preservation of textures and fine details. In the original algorithm we compute $d(p,q)^2$ as the squared Euclidean distance between the 2 patches centered at p and q respectively, i.e.

$$d_{orig}(p, q)^2 = \sum_{x=-M}^{M} \sum_{y=-M}^{M} K_p(x, y)(I(p + (x, y)) - I(q + (x, y)))^2$$

Figure 3B:
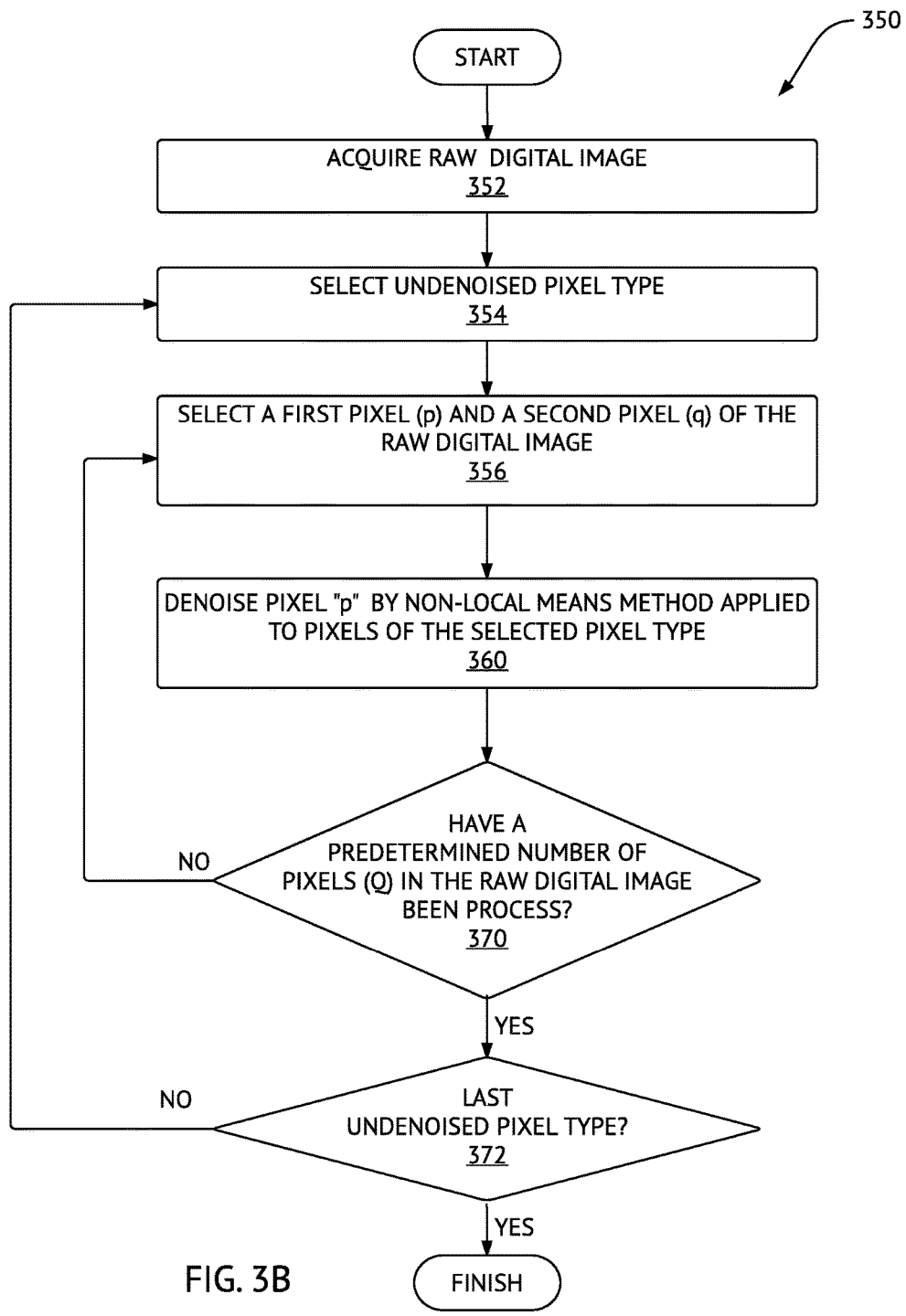
FIG. 3B shows a flowchart illustrating a method for denoising of digital images according to another embodiment of the present invention.
Figure 3C:
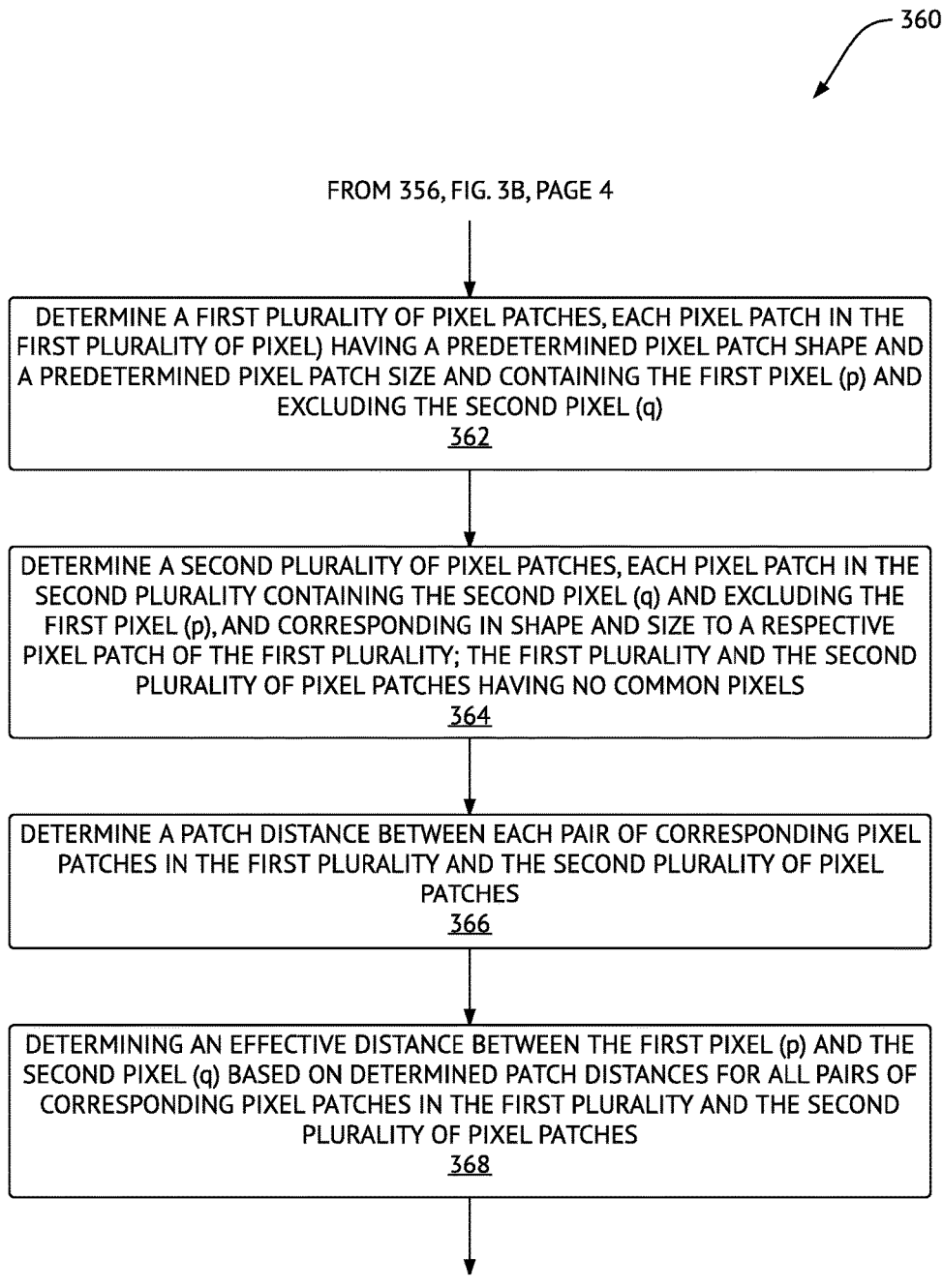
FIG. 3C shows a flowchart illustrating a method of a step in the flowchart shown in FIG. 3B.

The method for denoising of digital images of the embodiment of the invention is illustrated by a flowcharts 350 and 360 of FIGS. 3B and 3C respectively. The steps 352, 354, 356, 3370, and 372 are substantially the same as respective steps 302, 304, 306, 308, 312, and 314 as described herein above. Step 360 is described in detail with reference to FIG. 3C.

After box 356 on FIG. 3B, a first plurality of pixel patches, each pixel patch in the first plurality of pixel having a predetermined pixel patch shape and a predetermined pixel patch size and containing the first pixel (p) is determined, box 362;

Then determining a second plurality of pixel patches, each pixel patch in the second plurality containing the second pixel (q), and corresponding in shape and size to a respective pixel patch of the first plurality, box 364;

Then a patch distance between each pair of corresponding pixel patches in the first plurality and the second plurality of pixel patches is determined, box 366;

Then an effective distance between the first pixel (p) and the second pixel (q) based on determined patch distances for all pairs of corresponding pixel patches in the first plurality and the second plurality of pixel patches is determined, box 368;

Then execution returns to box 370 on FIG. 3C.

2.1 Patch Distance for Texture Preserving Denoising

In the texture preserving version of the raw image denoiser we not only consider the patches that are centered at p and q, but also all patches that are shifted by some offset and that still keep pixel p within the patch. Then $d(p,q)^2$ in the texture preserving version of the denoiser is the maximum of the squared distances between all pairs of shifted patches, with the same shift for both patches. Note that in this version we not only allow patches of odd size (like 3 by 3 pixels) but also of even size (like 2 by 2 pixels), in this setting, M denotes the patch size (i.e. its diameter) while it denoted the patch radius in the description of the original algorithm and in the formula of $d_{orig}(p,q)^2$ above.

We are now going to give an explicit formula to compute the distance d(p,q) in the texture preserving version, to this end we introduce the following notation:

$$\delta(p, q, i, j) = \sum_{x=j-M_1+1}^{j} \sum_{y=i-M_2+1}^{i} (I(p + (x, y)) - I(q + (x, y)))^2$$

With i, j∈{0, . . . , M−1}

δ(p,q,i,j) is the squared distance between patches shifted by offset (i, j) containing p and q. The function $K_p$ can be used to make the shape of the patch different from a square (for example a disc-like shape) by putting weight 1 to some pixels and weight 0 to the others. It can also be used to give more weight to some pixels than others. Pixel patches are preferably square or rectangular, however it is understood that pixel patches of other shapes may be chosen, for example, circle, oval, hexagon, octagon, polygon, or patches of an arbitrary shape. Using $$K_p(x,y,i,j)=1$$

is also acceptable and makes possible to speed up the algorithm as described in section 2.5.

The squared distance between pixels p and q is computed by aggregating all the δ(p,q,i,j) with an aggregation function A:

$$d(p,q)^2 = A(\delta(p,q,0,0), \ldots, \delta(p,q,0,M-1), \delta(p,q,1,0), \ldots, \delta(p,q,M-1,M-1))$$

That aggregation function may be for example the mean or average across the δ(p,q,i,j):

$$d(p, q)^2 = \frac{1}{(M-1)^2} \sum_{i=0}^{M-1} \sum_{j=0}^{M-1} \delta(p, q, i, j)$$

The best aggregation for the purpose of preserving texture details is the maximum function:

$$d(p, q)^2 = \max_{i,j \in \{0, \ldots, M-1\}} \delta(p, q, i, j)$$

2.2 Example with M=2

An example of distance computation is presented in FIGS. 3C1, 3C2, 3C3 and 3C4 for the 4 possible shifts when the patch size is M=2 and assuming $K_p(x,y,i,j)=1$.

A squared distance between patches in the first example of patches containing pixels (p) and (q) shown in FIG. 3C1 is as follows:

$$\delta(p,q,0,0)=(I(p_1)-I(q_1))^2+(I(p_2)-I(q_2))^2+(I(p_4)-I(q_4))^2+(I(p)-I(q))^2$$

A squared distance between patches in the second example of patches containing pixels (p) and (q) shown in FIG. 3C2 is as follows:

$$\delta(p,q,0,1)=(I(p_2)-I(q_2))^2+(I(p_3)-I(q_3))^2+(I(p)-I(q))^2+(I(p_5)-I(q_5))^2$$

A squared distance between patches in the third example of patches containing pixels (p) and (q) shown in FIG. 3C3 is as follows:

$$\delta(p,q,1,0)=(I(p_4)-I(q_4))^2+(I(p)-I(q))^2+(I(p_6)-I(q_6))^2+(I(p_7)-I(q_7))^2$$

Figure 4:
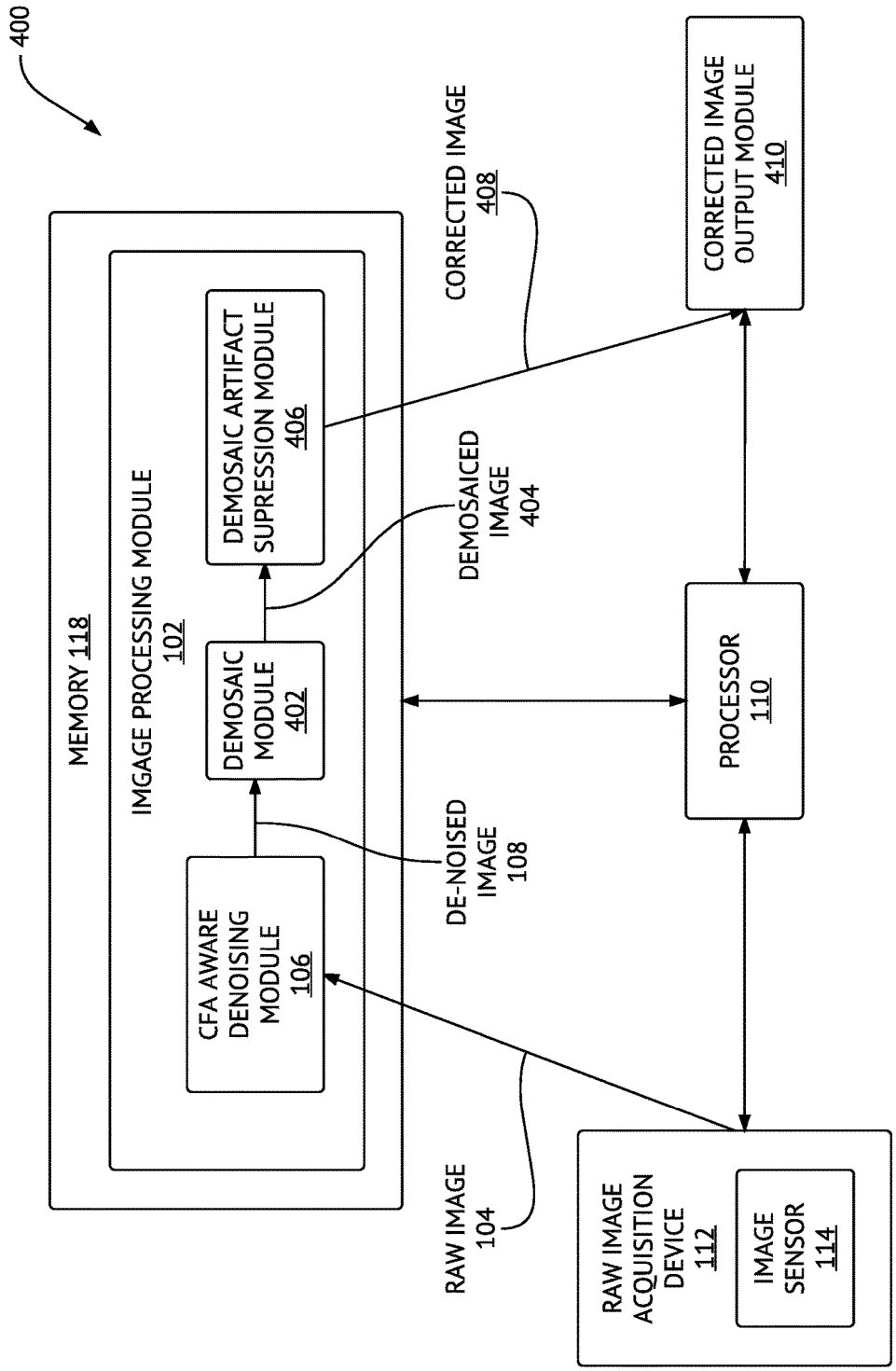

A squared distance between patches in the fourth example of patches containing pixels (p) and (q) shown in FIG. 3C4 is as follows:

$$\delta{p,q,1,1)=(I(p)-I(q))^2+(I(p_5)-I(q_5))^2+(I(p_7)-I(q_7))^2+(I(p_8)-I(q_8))^2$$

2.3 Discussion of the Distance for Texture Preservation

This way of computing the distance between pixels helps to denoise more strongly flat areas compared to textured areas. Hence it favors details preservation where there are details to be preserved and conversely does a better cleaning of the image where there are less details. In a textured area, the highest $\delta(p,q,i,j)$ is likely to be especially high, since it is based on the difference between different features (or different parts of the same feature). In a flat area, on the contrary the patches roughly have the same score. This tends to make the distance larger for textured areas than for flat areas, and then to make weights w(p,q) smaller for textured areas than for flat areas. As a result denoising tends to be stronger for flat areas than for textured areas.

2.4 Overall Denoising Formula

The rest of the algorithm is identical to the original algorithm, just replacing $d(p,q)^2$ by its alternative definition. The final formula to compute the denoised pixel p is:

$$\mathring{I}(p) = \frac{1}{C(p)} \sum_{q \in N(p)} \exp\left(\frac{-d(p,q)^2}{h^2}\right) I(q) \text{ with}$$

$$C(p) = \sum_{q \in N(p)} \exp\left(\frac{-d(p,q)^2}{h^2}\right)$$

h is the strength of the denoiser. Ranges of useful values for parameters are given at section 2.6.

Remark: By default $N(p)=\{p+2(i,j); i,j\in\{-K, \ldots, K\}\}$ but it is also possible to choose a different shape for N(p), the only requirement is that it only contains pixels of the same Bayer type as pixel p. For instance a disc-like shape would be $$N(p)=\{p+2(i,j); i,j\in\{-K,\ldots,K\}, i^2+j^2 \le K^2\}.$$

Alternatively, the neighborhood shape may be a circle, an oval, a hexagon, an octagon, or a polygon, or any arbitrary shape. However a rectangular shape for N(p) has the advantage to make possible to speed up the algorithm as described in section 2.5. In its most general form, a rectangular shape for N(p) would be:

$$N(p)=\{p+2(i,j); i\in(-K_1,\ldots,K_1), j\in-K_2\ldots,K_2 \text{with}$$

$K_1$ and $K_2$ positive integers.

2.5 Computational Complexity

A implementation of the above texture preserving version of the distance would be significantly more expensive than the original version for a given patch size. Computing $\delta(p,q,i,j)$ requires two nested loops of M iterations each, d(p,q) requires two nested loops of M iterations each too, then the sum over $q \in N(p)$ requires two nested loops of N iterations each. The computational complexity of the version of the texture preserving denoiser is $\Theta(N_{pix}K^2M^4)$ where $N_{pix}$ is the number of pixels in the input image, while the complexity of the original denoiser is $\Theta(N_{pix}K^2M^2)$, so the texture preserving denoiser requires $M^2$ times more computations.

However, in the case where $K_p(x,y,i,j)=1$ and N(p) has a rectangular shape, multiple computations of the same squared difference between pixel intensities can be avoided by using the technic of integral images. Reference for integral image method: "*Rapid Object Detection using a Boosted Cascade of Simple Features*" P. Viola, M. Jones, CVPR 2001. In our case this technic would allow to reuse computations of squared differences between pixel intensities across distances of patches that contain the same pair of pixels.

In a more general case, for the integral image method to be applicable, both N(p) and pixel patches should be either square or rectangular, and it still works if only N(p) is square and the pixel patch is rectangular, and vice versa.

When patches are rectangular and N(p) is rectangular, the formulas are:

$$\delta(p, q, i, j) = \sum_{x=j-M+1}^{j} \sum_{y=i-M+1}^{i} (I(p + (x, y)) - I(q + (x, y)))^2$$

with $M_1 \neq M_2$ and $$N(p)=(p+2(i,j); i\in(-K_1,\ldots,K_1), j\in(-K_2,\ldots,K_2)\}$$

with $K_1 \neq K_2$.

When patches are squares and N(p) is rectangular, the formulas are:

$$\delta(p, q, i, j) = \sum_{x=j-M_1+1}^{j} \sum_{y=i-M_2+1}^{i} (I(p + (x, y)) - I(q + (x, y)))^2$$

and $$N(p)=(p+2(i,j); i\in(-K_1,\ldots,K_1), j\in(-K_2,\ldots,K_2)\}$$

with $K_1 \neq K_2$.

When patches are rectangular and N(p) is square, the formulas are:

$$\delta(p, q, i, j) = \sum_{x=j-M+1}^{j} \sum_{y=i-M+1}^{i} (I(p + (x, y)) - I(q + (x, y)))^2$$

with $M_1 \neq M_2$ and $$N(p) = \{p + 2(i,j); i,j \in \{-K, \ldots, K\}\}.$$

When patches are squares and N(p) is square, the formulas are:

$$\delta(p, q, i, j) = \sum_{x=j-M_1+1}^{j} \sum_{y=i-M_2+1}^{i} (I(p + (x, y)) - I(q + (x, y)))^2$$

and $$N(p) = \{p + 2(i,j); i,j \in \{-K, \ldots, K\}\}.$$

The most general form for $\delta(p,q,i,j)$ that still allows to use integral images is:

$$\delta(p, q, i, j) = \sum_{x=j-M_1+1}^{j} \sum_{y=i-M_2+1}^{i} (I(p + (x, y)) - I(q + (x, y)))^2$$

Remark: that $K_p(x,y,i,j)$ is missing because it is taken as constant 1 and in the bounds of the summations the constant positive integers $M_1$ and $M_2$ appear instead of just M, in order to allow any rectangular patch instead of just square patches.

Actually patches are not square in this example because in the sum, the variable x spans the integers from $j-M_1+1$ to j, which are M1 different values, and the variable y spans the integers from $i-M_2+1$ to i, which are M2 different values. So the height and the width of the patch are different. So the rectangular shape of the patch is achieved here thanks to the different bounds of the sums rather than thanks to the kernel Kp, because in the case of a rectangular shape is simpler to express it this way. Off course that trick cannot be used if we want a disc-like shape, in that case we would need to use Kp to achieve a disc like shape, but here we only need a rectangular shape, so it is appropriate.

The most general form for N(p) that that still allows to use integral images is:

$$N(p) = \{p + 2(i,j); i \in \{-K_1, \ldots, K_1\}, j \in \{-K_2, \ldots, K_2\}\}$$

with $K_1$ and $K_2$ positive integers.

The technic of integral images could be used on the whole image, in that case it takes the complexity down to $\Theta(N_{pix} K_1 K_2)$ for both the original and the texture preserving denoisers. For reasons related to the memory it could be impossible to do so, for instance with line buffer architectures. Then the technic of integral images could still be used at the level of the neighborhood N(p) of each pixel p, in that case it takes the complexity down to $\Theta(N_{pix} K_1 K_2 M_1 M_2)$ for the texture preserving denoisers.

We derive computations for applying the technic of integral images to the computations of distances at both the level of the neighborhood N(p) and the level of the whole image. For simplicity of notation we write the derivation for the case $M := M_1 = M_2$ but this does not limit the generality of the algorithm to the case $M_1 \neq M_2$.

2.5.1 Integral Image at the Level of the Neighborhood N(p) of Pixel p

We first compute the following quantity:

$$\rho(p, q, y, j) = \sum_{x=j-M+1}^{j} (I(p + (x, y)) - I(q + (x, y)))^2$$

for all $j \in \{0, \ldots, M-1\}$ and $y \in \{-M+1, \ldots, M-1\}$.

To compute it efficiently we use the following recurrence $$\rho(p,q,y,j) = \rho(p,q,y,j-1) + (I(p+(j,y)) - I(q+(j,y)))^2 - (I(p+(j-M,y)) - I(q+(j-M,y)))^2$$

Then notice that $$\delta(p, q, i, j) = \sum_{y=i-M+1}^{i} \rho(p, q, y, j)$$

Then to compute efficiently $\delta(p,q,i,j)$ for all $i,j \in \{0, \ldots, M-1\}$ we use the following recurrence $$\delta(p,q,i,j) = \delta(p,q,i-1,j) + \rho(p,q,i,j) - \rho(p,q,i-M,j)$$

Using the two recurrences allow to precompute all the $\delta(p,q,i,j)$, $i,j \in \{0, \ldots, M-1\}$ with computational complexity $\Theta(M^2)$. This allows to have a computational complexity on the whole image of $\Theta(N_{pix} K^2 M^2)$, which is the same as for the original raw image denoiser. In practice we must take into account that the computational complexity has still a multiplicative constant such that there is a speed up with respect to the implementation as soon as $M \geq 3$ but not for $M=2$. More precisely, the number of squared differences that are computed are $M^4$ for the implementation and $(3M-2)^2$ when using the technic of integral images at the level of the neighborhood N(p) of pixel p.

2.5.2 Integral Image at the Level of the Whole Image

We first compute the following quantity:

$$\rho'(p, q) = \sum_{x=-M+1}^{0} (I(p + (x, 0)) - I(q + (x, 0)))^2$$

for all pixels p in the image and for all pixels $q \in N(p)$.

To compute it efficiently we use the following recurrence $$\rho'(p,q) = \rho'(p-(1,0), q-(1,0)) + (I(p)-I(q))^2 - (I(p-(M,0)) - I(q-(M,0)))^2$$

Then $$\delta(p, q, 0, 0) = \sum_{y=-M+1}^{0} \rho'(p + (0, y), q + (0, y))$$

To compute efficiently $\delta(p,q)$ for all pixel p in the image and for all $q \in N(p)$ we use the following recurrence $$\delta(p,q,0,0) = \delta(p-(0,1), q-(0,1), 0, 0) + \rho'(p,q) - \rho'(p-(0,M), q-(0,M))$$

Now $\delta(p,q,i,j)$ does not require any additional computation because $\delta(p,q,i,j) = \delta(p+(j,i), q+(j,i), 0, 0)$, so all $\delta(p,q,i,j)$ for all $i,j \in \{0, \ldots, M-1\}$, all pixels p and all pixels $q \in N(p)$ are precomputed with computational complexity $\Theta(N_{pix})$.

Finally, using those precomputed δ(p,q,i,j), the number of floating point operations is $\Theta(N_{pix}K^2)$. The number of comparisons is still $\Theta(N_{pix}K^2M^2)$ though, because $$(p, q)^2 = \max_{i,j \in \{0,\ldots,M-1\}} \delta(p, q, i, j)$$

requires to loop over i, j∈{0, . . . , M−1} even though the δ(p,q,i,j) are precomputed.

2.6 Ranges for Parameters

We give ranges of useful values for the parameters of the algorithm: K, M and h. For parameter h give one range for the case where an Anscombe transform has been applied to the input image before denoising on one hand and one range for the case where the Anscombe transform is not used assuming the pixel values are normalized in the range [0, 1]. For each parameter we give three nested ranges of increasing length from preferred to less preferred. However it should be noted that those ranges are only indicative and the preferred values for the parameters depends on the camera, the rest of the ISP (image signal processor), the computational budget available, and the lighting conditions.

Then choose h∈[0.2,1.5]. Provided no transform has been applied and the range of the input image is [0, 1] then choose h∈[0.001,0.3].

2.6.1 Preferred Ranges

In some preferred embodiments a value of K is chosen from a range of about 5 to 8 and a value of M is chosen from a range of about 2 to 3. Provided an Anscombe transform has been applied to the raw image 104, a value of h is chosen from a range of about 0.2 to 1.5; otherwise a value of h is chosen from a range of about 0.001 to 0.2.

2.6.2 Other Preferred Ranges

In other preferred embodiments a value of K is chosen from a range of about 3 to 12 and a value of M is chosen from a range of about 2 to 4. Provided an Anscombe transform has been applied to the raw image 104, a value of h is chosen from a range of about 0.1 to 2.5; otherwise a value of h is chosen from a range of about 0.001 to 0.3.

2.6.3 Still Other Preferred Ranges

In still other preferred embodiments a value of K is chosen from a range of about 1 to 16 and a value of M is chosen from a range of about 2 to 5. Provided an Anscombe transform has been applied to the raw image 104, a value of h is chosen from a range of about 0.01 to 4; otherwise a value of h is chosen from a range of about 0.001 to 0.2.

3.0 High Frequency Artifact Removal Filter

A denoised image may exhibit some high frequency artifacts in each of the Bayer channels. We present here a high frequency filter module 218, see FIG. 2, that attenuate those artifacts while still preserving the details of the image. It is similar to the demosaic artifact suppression filter described herein below, but applied independently on each Bayer channel.

3.1 Filter Description

We now give the details of that high frequency artifact removal filter 218. We first define an image guide for the filter as follows. For each pixel p=(x,y) of the image I that enters the filter, we note:

$$Z(x,y,1) = I(x,y) + I(x+2,y) + I(x,y-2) + I(x+2,y-2)$$

$$Z(x,y,2) = I(x,y) + I(x-2,y) + I(x,y+2) + I(x-2,y+2)$$

$$Z(x,y,3) = I(x,y) + I(x+2,y) + I(x,y+2) + I(x+2,y+2)$$

We note Z(p) the 4D vector (Z(x,y,k), k∈{0, 1, 2, 3}), the filtered value is then:

$$z = \frac{1}{C(p)} \sum_{q \in N(p)} I(q) w_{hf}(p, q) \text{ with } C(p) = \sum_{q \in N(p)} w_{hf}(p, q)$$

$$N(p) = \{p + 2(i, j); M \le i, j \le M\}$$

and with $$w_{hf}(p, q) = \exp\left(\frac{-|z(p) - Z(q)|^2}{\rho^2}\right)$$

where |.| denotes the Euclidean norm.

3.2 Physical Interpretation of the Filter

The action of the filter 218 is modulated by the weights $w_{hf}$ and those weights decrease with the distances |Z(p)−Z(q)|. Now those distances are based on Z which is box filtered. This box filtering makes the distance insensitive to Nyquist frequency. So the modulation of the filter 218 ignores the highest frequency. This explain why medium and lower frequencies are preserved while higher frequencies are filtered more strongly. The filter 218 needs to be used with a strength typically lower than the previous denoiser, because otherwise all details in the highest frequencies are lost.

3.3 Ranges for Parameters

For parameter ρ we consider two cases:

Case A. Input image had Anscombe transform applied and the filter is applied before the inverse Anscombe transform.

Case B. Anscombe transform is not used and input image normalized in [0, 1].

3.3.1 Preferred Ranges

In some preferred embodiments a value of M is chosen from a range of about 1 to 2. Provided an Anscombe transform has been applied to the raw image 104 (Case A), a value of ρ is chosen from a range of 0.003 to 0.03; otherwise (Case B) a value of ρ is chosen from a range of 0.0001 to 0.001.

3.3.2 Other Preferred Ranges

In other preferred embodiments a value of M is chosen from a range of about 1 to 2. Provided an Anscombe transform has been applied to the raw image 104 (Case A), a value of ρ is chosen from a range of 0.001 to 0.05; otherwise (Case B) a value of ρ is chosen from a range of 0.0001 to 0.003.

3.3.3 Still Other Preferred Ranges

In other preferred embodiments a value of M is chosen from a range of about 1 to 4. Provided an Anscombe transform has been applied to the raw image 104 (Case A), a value of ρ is chosen from a range of 0.001 to 0.1; otherwise (Case B) a value of ρ is chosen from a range of 0.0001 to 0.01.

4.0 Demosaic Artifact Suppression in Digital Images

A system 400 for demosaic artifact suppression in digital images of another embodiment of the invention is shown in FIG. 4. The system 400 of FIG. 4 is similar to the system 100 of FIG. 1, except for the additional Demosaic Module 402, and the Demosaic Artifact Suppression Module 406 replacing the CFA Pattern Aware Denoising Module 106, and reference numerals in FIG. 4 are repeated from FIG. 1 for illustrating similar elements.

The system 100 comprises a Raw Image Acquisition Device 112, for example a digital camera, image scanner or motion picture film scanner comprising an image sensor device 114 such as CCD or CMOS image sensor, for acquiring a raw image 104. The raw image 104 contains minimally processed data from the image sensor 114, in a raw image format.

The acquired raw image 104 is supplied to an Image Processing Module 102 comprising a Demosaic Module 402, outputting a demosaiced image 404, and a Demosaic Artifact Suppression Module 406 for processing the demosaiced image 404 into a corrected image 408.

The Image Processing Module 102, the Demosaic Module 402 and the Demosaic Artifact Suppression Module 406 are stored in a memory device 118 and comprise computer executable instructions stored in the memory device 118 for execution by a hardware processor 110. The Demosaic Artifact Suppression Module 406 outputs the corrected image 408 through a Corrected Image Output Module 410 which contains computer readable instructions stored in a memory (not shown) and is responsible for storage or further processing of the corrected image 408 or transmission of the corrected image 408 over a network.

Figure 5:
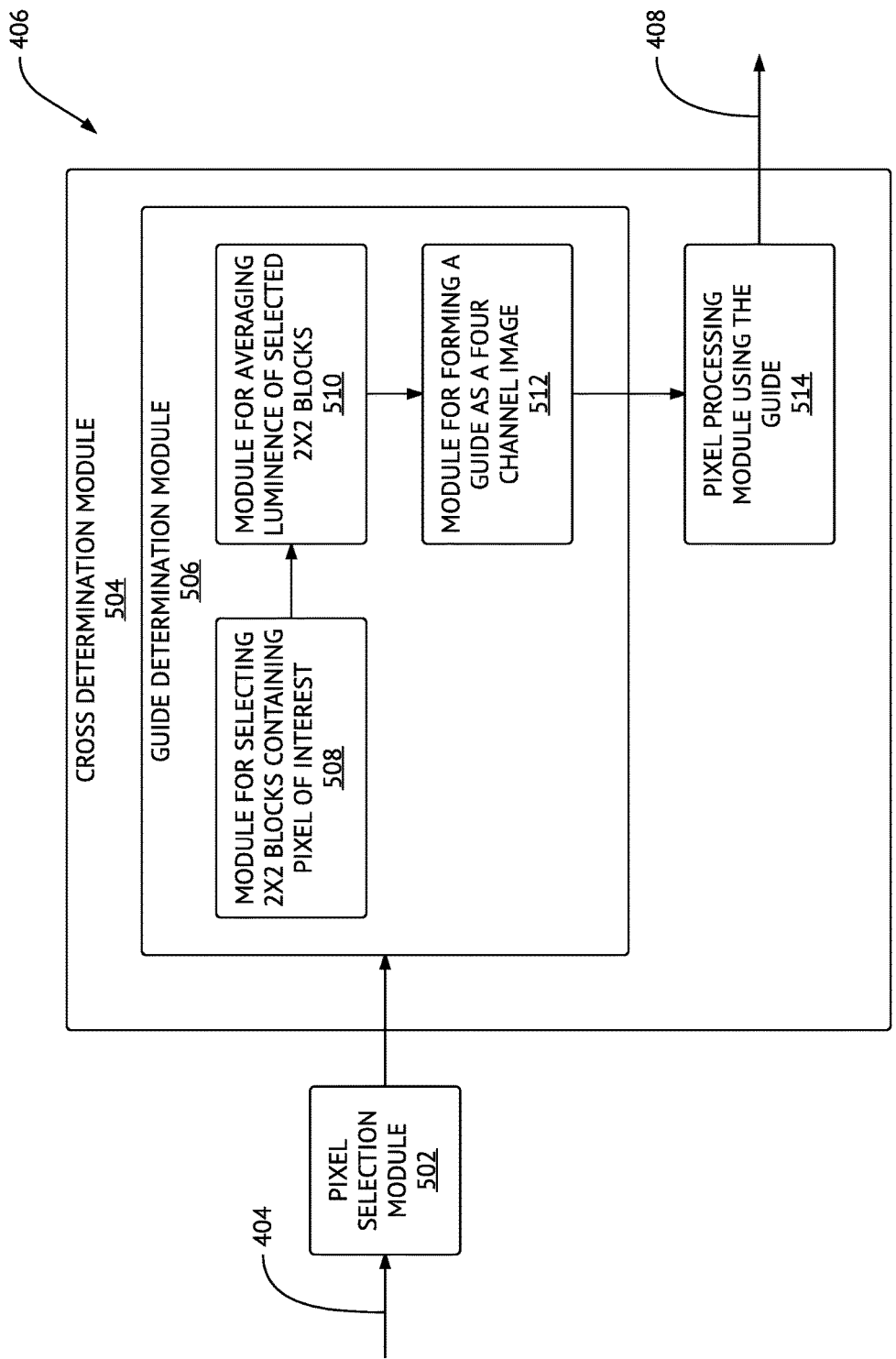
FIG. 5 illustrates a Demosaic Artifact Suppression Module of FIG. 4 in more detail.

FIG. 5 shows the Demosaic Artifact Suppression Module 406 of FIG. 4 in more detail. In the embodiment of the invention, the CFA is a Bayer's filter.

The Demosaic Artifact Suppression Module 406 comprises a Pixel Selection Module 502 for selecting a pixel of interest for processing, and an Improved Cross Bilateral Filter 504, which is a guided filter. The Improved Cross Bilateral Filter 504 comprises a Guide Determination Module 506 for determining a guide, or a special image, for applying in the Improved Cross Bilateral Filter 504 of the embodiment of the invention, and a Pixel Processing Module 514 using the determined guide.

The Guide Determination Module 506 comprises a module for selecting 2×2 blocks of pixels containing a pixel "p" of interest; a Module for averaging the luminance of the selected 2×2 blocks of pixels 510; and a Module for forming the guide as a four channel image 512.

In the embodiment of the invention, assuming that a Bayer's filter is used for the acquisition of the raw image 104, there will be four blocks of 2×2 pixels which contain the pixel "p" of interest.

Denoting p1, p2, p3, p4, p5, p6, p7 and p8 pixels neighboring the pixel "p" of interest, and Y(q) the luminance of any pixel q, we can define the computation of the 4-dimensional component of the Guide for the pixel "p" as presented in FIGS. 5A1, 5A2, 5A3 and 5A4.

An average luminance for each of these four blocks of 2×2 pixels (corresponding to the pixel "p" of interest) is determined (L1$p$, L2$p$, L3$p$ and L4$p$), and the values of the average luminance for these blocks are used as component of a 4-dimensional vector.

Figures 5A1, 5A2, 5A3, 5A4:
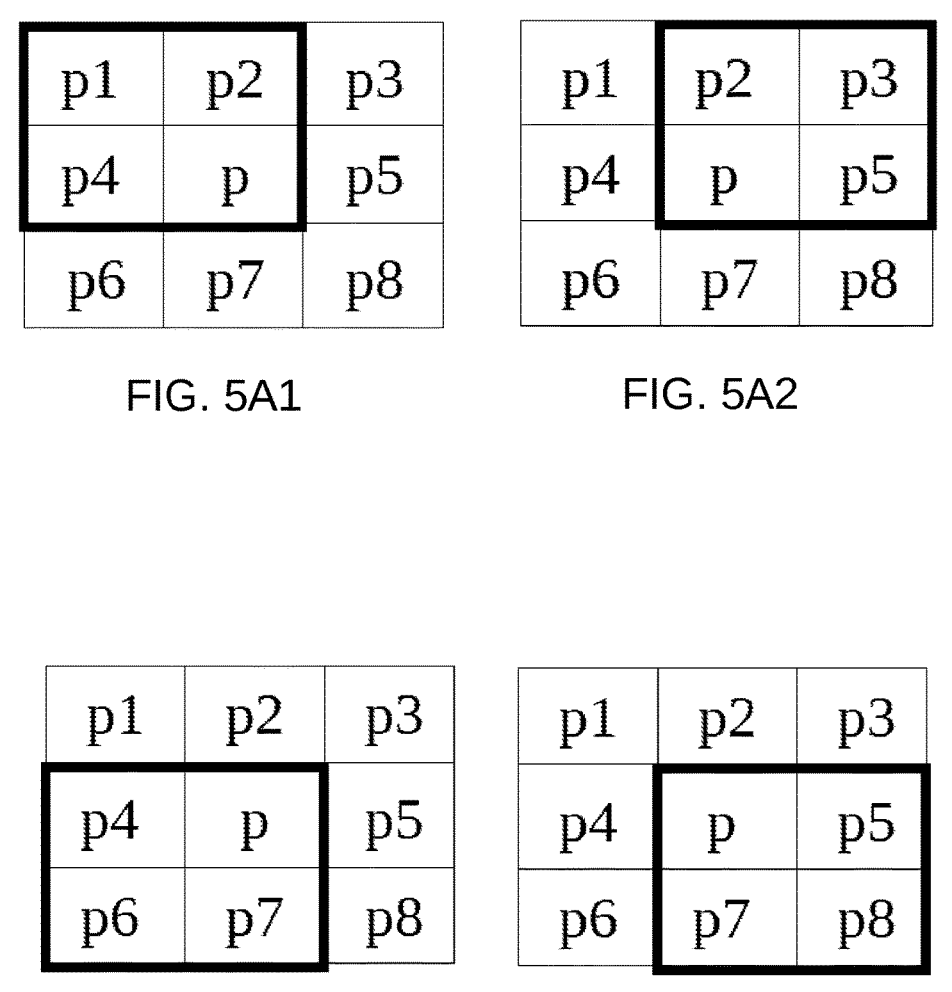

According to FIG. 5A1, the average luminance L1$p$ is defined based on 2×2 pixels p1, p2, p4 and p as follows:

$$L1p = (Y(p1)+Y(p2)+Y(p4)+Y(p))/4.$$

According to FIG. 5A2, the average luminance L2$p$ is defined based on 2×2 pixels p2, p3, p5 and p as follows:

$$L2p = (Y(p2)+Y(p3)+Y(p)+Y(p5))/4.$$

According to FIG. 5A3, the average luminance L3$p$ is defined based on 2×2 pixels p4, p6, p7 and p as follows:

$$L3p = (Y(p4)+Y(p)+Y(p6)+Y(p7))/4.$$

According to FIG. 5A4, the average luminance L4$p$ is defined based on 2×2 pixels p5, p7, p8 and p as follows:

$$L4p = (Y(p)+Y(p5)+Y(p7)+Y(p8))/4.$$

The same procedure is repeated for all pixels in the demosaiced image, forming a 4-channel image, or a 4-dimensional vector with components (L1$p$, L2$p$, L3$p$, L4$p$) for each pixel, thus forming a Guide for use in the guided Improved Cross Bilateral Filter 504.

It should be noted that rather than the average luminance, the sum of the luminances could be used as effectively.

It is understood that other types of CFA are also possible, and the Cross Bilateral Filter may be substituted by Non-Local Means filter or another filter suitable for processing a demosaiced image. If using a filter other than the cross bilateral, the previously defined guide should be used for computing the weights between pixels, rather than the image itself.

The Pixel Selection Module 502, and the Improved Cross Bilateral Filter 504 including its modules 506 and 514 comprise computer readable instructions stored in a memory for execution by the hardware processor 110.

Figure 6:
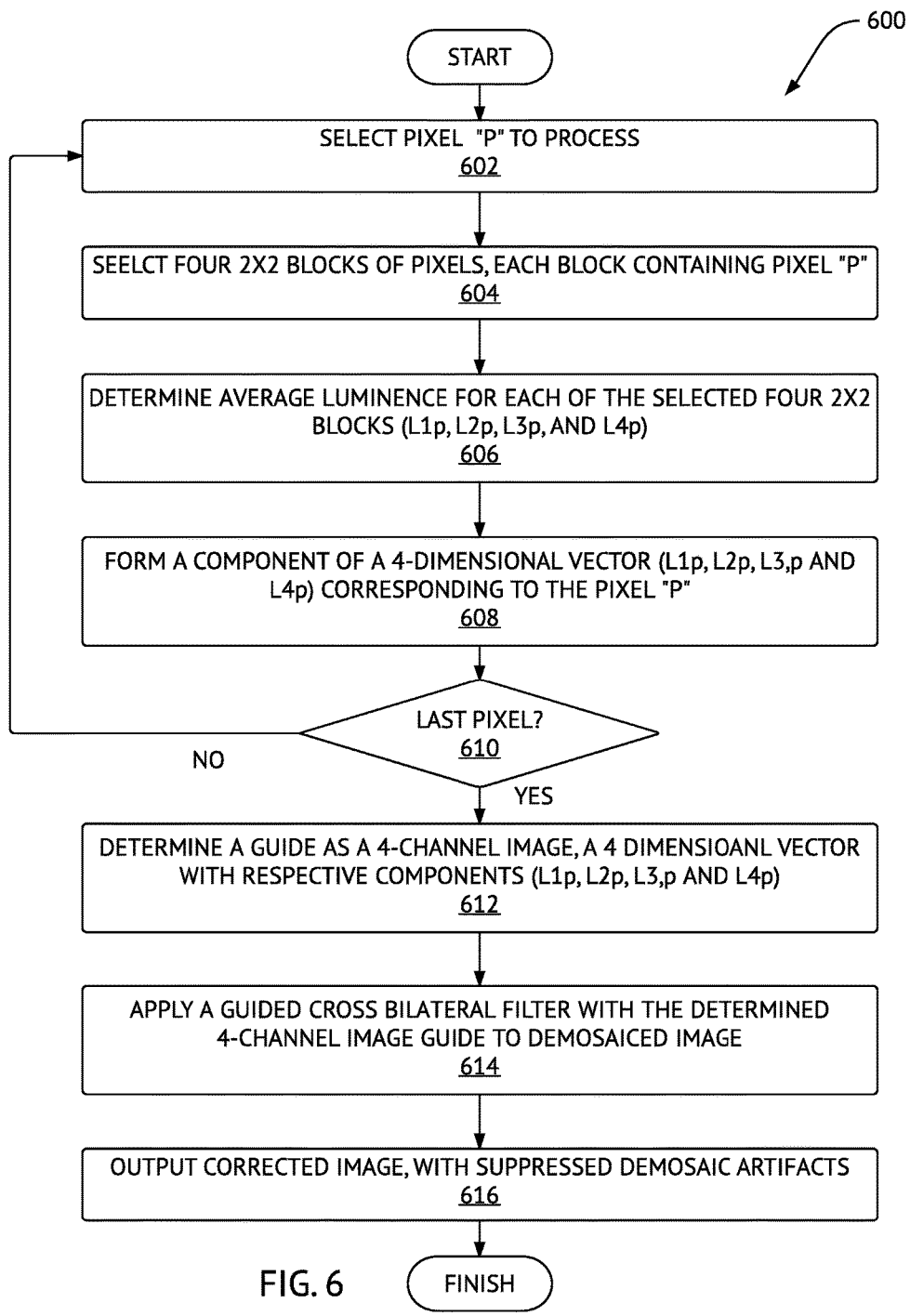
FIG. 6 shows a flowchart illustrating a method for demosaic artifact suppression in digital images according to the yet another embodiment of the present invention.

The method for demosaic artifact suppression in digital images of the embodiment of the invention is illustrated by a flowchart 600 of FIG. 6.

Upon obtaining the demosaiced image 404 from the Demosaic Module 402, the method selects a pixel "p" in the demosaiced image 404 to process (box 602).

Next, four 2×2 blocks of pixels are selected, containing the pixel "P" of interest (box 604), followed by determining an average luminance for each of the four selected blocks (box 606), the average luminance for each of the selected four blocks being designated as L1$p$, L2$p$, L3$p$ and L4$p$.

Next, a 4D component of a 4-dimensional vector is formed, corresponding to the pixel "p", the 4D component of the 4-dimensional vector comprising the average luminance for the selected four blocks (L1$p$, L2$p$, L3$p$, L4$p$).

Provided the pixel "p" is not the last pixel in the demosaiced image 404 (exit "No" from box 610), the method returns back to the box 602 for processing the next pixel.

Provided the pixel "p" is the last pixel in the demosaiced image 404 (exit "Yes" from box 610), the method proceeds to determining an improved Guide of the embodiment of the invention (box 612), which is a complete 4-dimensional vector comprising multiple 4D components, corresponding to individual pixels in the demosaiced image 404. We will also refer to the 4-dimensional vector as a 4-channel image, or also as an image Guide, to be used in a guided Cross Bilateral Filter as described below.

The improved Guide of the embodiment of the invention, which has been determined in box 612, is used in the Cross Bilateral Filter (box 614), which is applied to the demosaiced image 404 (box 614).

The guided Cross Bilateral Filter with the improved Guide outputs the corrected image 408 through the Corrected Image Output Module 410 (box 616), followed by the termination of the method.

4.1 Method for Demosaic Artifact Suppression

The method for demosaic artifact suppression of the embodiment of the invention has been described assuming that the pattern of the color filter array is 2 pixels by 2 pixels square, and the image has 3 color channels, red, green and blue. This is the case for instance for the Bayer pattern filter.

Let I=($I_R$, $I_G$, $I_B$) be the demosaiced color image 404 to correct for demosaicing artifacts and Y its luminance.

For any pixel p=(x,y) we define:

$$Z(x,y,0) = Y(x,y)+Y(x-1,y)+Y(x,y-1)+Y(x-1,y-1)$$

$$Z(x,y,1) = Y(x,y)+Y(x+1,y)+Y(x,y-1)+Y(x+1,y-1)$$

$$Z(x,y,2)=Y(x,y)+Y(x-1,y)+Y(x,y+1)+Y(x-1,y+1)$$

$$Z(x,y,3)=Y(x,y)+Y(x+1,y)+Y(x,y+1)+Y(x+1,y+1)$$

For any pixel p=(x,y), we note Z(p) the 4D vector (Z(x,y,k), k∈{0, 1, 2, 3}). Z is the improved guide of the embodiment of the invention, which is used for performing a cross bilateral filtering on the demosaiced image 121. The coefficients/components of the vector Z(p) are the average luminance of each of the four 2×2 blocks that contain the pixel p.

The RGB image is then filtered with a cross bilateral filter or any of its variations, guided with the 4 channel image Z. Further details are provided below.

Let $I_i(p)$ be the intensity value at pixel p for the channel i∈{R,G,B}.

Let $\hat{I}$ be the filtered image. Then for each pixel p, for each color channel i∈{R,G,B}, the value of the filtered image at pixel p and for channel i is defined as follows:

$$\hat{I}_i(p) = \frac{1}{W_p} \sum_{q \in P(I)} w(p,q) I_i(q)$$

where:

P(I) is the set of all pixels in the image.

$w(p,q)=r_Z(p,q)s(p,q)$ is the weight of pixel q to filter pixel p.

$r_Z$ is the range kernel, guided by Z. It measures the similarity of the features in the guide Z for pixels P and q, usually it is takes the following form:

$$r_Z(p,q) = \exp\left(-\frac{\|Z(p)-Z(q)\|^2}{\rho^2}\right).$$

s is the space kernel. It measures how close in space in the image the pixels P and q are.

Usually it is chosen as:

$$s(p,q) = \exp\left(-\frac{\|p-q\|^2}{\sigma^2}\right),$$

another common choice is the step function: $s(p,q)=\delta(|x_p-x_q|<k)\delta(|y_p-y_q|<k)$, where $p=(x_p,y_p)$ and $q=(x_q,y_q)$, which is equal to 1 when $|x_p-x_q|<k$ and $|y_p-y_q|<k$, and equal to 0 otherwise.

$$W_p = \sum_{q \in P(I)} w(p,q)$$

is a normalizing factor.

Remarks:

1. Assuming the range of the image is [0,1], typical values for the parameters above are: $\rho=5\cdot10^{-4}$, $\sigma=4$, k=4, which may be tuned appropriately for better results depending on the input.

2. The summation over q∈P(I) above can be simplified in practice to a smaller domain q∈B(p), where B(p)={q=p+(x, y)|−b<x,y<b} with b=3σ or b=k depending on which space kernel s is chosen.

3. Any fast implementation of the bilateral filter, or variations around the bilateral filter, that allows to do guided filtering, can be used to compute $\hat{I}$. The only requirement is that the 4 channel image Z defined above is used as the guide. Examples of such fast implementations include: the bilateral grid described in "*Real-Time Edge-Aware Image Processing With The Bilateral Grid*," J. Chen, S. Paris, and F. Durand, ACM Transactions on Graphics (Proc. SIGGRAPH 07), page 103, 2007, the permutohedral lattice described in "*Fast High-Dimensional Filtering Using The Permutohedral Lattice*," A. Adams, J. Baek, and M. A. Davis, Computer Graphics Forum (Proc. Eurographics), 2010, the Gaussian kd-trees filter described in "*Gaussian Kd-Trees For Fast High-Dimensional Filtering*," A. Adams, N. Gelfand, J. Dolson, and M. Levoy, ACM Transactions on Graphics (Proc. SIGGRAPH 09), pages 1-12, 2009, the domain transform recursive filter described in "*Domain Transform For Edge-Aware Image And Video Processing*," E. S. L. Gastal, M. M. Oliveira. ACM TOG 30, 4 (2011), 69:1-69:12 the adaptive manifold filter described in "*Adaptive Manifolds For Real-Time High-Dimensional Filtering*," E. S. L. Gastal, M. M. Oliveira, ACM TOG 31, 4 (2012), 33:1-33:13. Proceedings of SIGGRAPH 2012.

Thus, an improved method and system for demosaic artifact suppression in digital image have been provided.

5.0 Edge Denoising

We now describe the edge denoising module 220 of FIG. 2. The edge denoising module 220 denoises strong edges on the raw image 104. It is meant to be run in parallel with the texture preserving raw image denoiser described above. Then the results of the two filters are blended together in a way described below.

For each pixel p, the edge denoising algorithm takes the following steps:

1. Estimate the normal to the edge. (details later)
2. Compute the blurred edge denoised value z at pixel p as the result of a 1D Gaussian filter centered on p using neighboring pixels projected to the normal to the edge. (details later)
3. Compute the blurred edge denoised shifted values $$z_l^-$$

and $$z_l^+$$

as in the previous step but with the 1D Gaussian filter centered on each of the 2 points located on the normal to the edge at a distance h of the pixel p. (details later)
4. Compute an approximate second order derivative, at scale h, along the normal to the edge: $\Delta=2z-z_l-z_r$.
5. Compute the sharpened edge denoised value at pixel p, $z_{sharp}=z+s\Delta$, s is the strength of the sharpening.
6. Compute minimum and maximum:

$$z_l^+\}$$

$$z_l^-, z_l$$

$$z_{min} = \min\{z, z_l$$

and $$+ i \}$$
$$-i, z_i$$
$$z_{max} = \max\{z, z_i\}$$

7. Compute the final sharpened edge denoised value with halo removal:

$$\tilde{I}(p) = \min(\max(z_{sharp}, z_{min}), z_{max})$$

Remarks:

The 1D Gaussian filter of step 2 is parameterized by a standard deviation a which can be increased to get stronger denoising and conversely (a typical value would be 1.5 or 2).

The parameters h and s appearing at steps 3 and 5 are parameters of the edge denoising filter to be chosen.

The filtering done at step 2 creates some amount of blur in z. The subsequent steps act as a sharpener. That sharpening effect can be limited to just cancel the blur introduced at step 2, or go even further and produce a sharpened denoised edge. Increasing h and s increases the sharpening effect and conversely. Example of values that would cancel the blur introduced at step 2 but not increase sharpness are h=2 and s=0.6.

The sharpened edge denoised value $z_{sharp}$ may produce black or white halos around the edge, the steps 6 and 7 mitigate this undesirable effect.

5.1. Estimation of the Normal to the Edge

The normal to the edge is estimated with the help of the following linear filters.

$$K_x = \begin{bmatrix} -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & 0 & -1 & 0 & 0 & 0 & 1 & 0 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \\ -1 & -1 & -1 & -1 & 0 & 1 & 1 & 1 & 1 \end{bmatrix}$$

$$K_y = \begin{bmatrix} -1 & -1 & -1 & -1 & -1 & -1 & -1 & -1 & -1 \\ -1 & -1 & -1 & -1 & 0 & -1 & -1 & -1 & -1 \\ -1 & -1 & -1 & -1 & -1 & -1 & -1 & -1 & -1 \\ -1 & -1 & -1 & -1 & 0 & -1 & -1 & -1 & -1 \\ 0 & 0 & 0 & 0 & 0 & 0 & 0 & 0 & 0 \\ 1 & 1 & 1 & 1 & 0 & 1 & 1 & 1 & 1 \\ 1 & 1 & 1 & 1 & 1 & 1 & 1 & 1 & 1 \\ 1 & 1 & 1 & 1 & 0 & 1 & 1 & 1 & 1 \\ 1 & 1 & 1 & 1 & 1 & 1 & 1 & 1 & 1 \end{bmatrix}$$

$$K_z = \begin{bmatrix} 0 & 1 & 1 & 1 & 1 & 1 & 1 & 1 \\ -1 & 0 & 1 & 1 & 1 & 1 & 1 & 1 \\ -1 & -1 & 0 & 1 & 1 & 1 & 1 & 1 \\ -1 & -1 & -1 & 0 & 1 & 1 & 1 & 1 \\ -1 & -1 & -1 & -1 & 0 & 1 & 1 & 1 \\ -1 & -1 & -1 & -1 & -1 & 0 & 1 & 1 \\ -1 & -1 & -1 & -1 & -1 & -1 & 0 & 1 \\ -1 & -1 & -1 & -1 & -1 & -1 & -1 & 0 \end{bmatrix}$$

$$K_w = \begin{bmatrix} -1 & -1 & -1 & -1 & -1 & -1 & -1 & -1 & 0 \\ -1 & -1 & -1 & -1 & -1 & -1 & -1 & 0 & 1 \\ -1 & -1 & -1 & -1 & -1 & -1 & 0 & 1 & 1 \\ -1 & -1 & -1 & -1 & -1 & 0 & 1 & 1 & 1 \\ -1 & -1 & -1 & -1 & 0 & 1 & 1 & 1 & 1 \\ -1 & -1 & -1 & 0 & 1 & 1 & 1 & 1 & 1 \\ -1 & -1 & 0 & 1 & 1 & 1 & 1 & 1 & 1 \\ -1 & 0 & 1 & 1 & 1 & 1 & 1 & 1 & 1 \\ 0 & 1 & 1 & 1 & 1 & 1 & 1 & 1 & 1 \end{bmatrix}$$

The raw image is filtered with each of those filters producing images $d_x$, $d_y$, $d_z$ and $d_w$ respectively. Then two estimates of the normal to the edge are computed, with $d_x$ and $d_y$ on one hand and with $d_z$ and $d_w$ on the other hand, represented by the complex numbers $g_{xy}$ and $g_{zw}$ respectively: $g_{xy} = d_x + i d_y$ and $$g_{zw} = (d_z + i d_w) e^{-i\frac{\pi}{4}}$$

(where $i=\sqrt{-1}$). Those two estimates are normalized and averaged to $$\bar{g} = 0.5 \left( \frac{g_{xy}}{|g_{xy}|} + \frac{g_{zw}}{|g_{zw}|} \right)$$

and finally the estimate of the unit vector normal to the edge is $$u = \frac{\bar{g}}{|\bar{g}|}.$$

Remarks:

The size of the filters given here is 9, but a larger size could be used in the case of very low light (i.e. very high noise), to make the estimate more robust, as long as the filter follows the pattern given here. Conversely a smaller size could be used in the case of moderate noise. Large filters are more robust to noise but computationally more expensive and are less accurate in the case of edges with high curvature.

There are 0 values every other coefficient in the central row of $K_x$ and in the central column of $K_y$ which may look surprising. The reason is if we do not put zero weight at those coefficients then for some color channel the two filters would put non zero weight to a different number of pixels. It is important that for each color channel the number of pixels with non zero weight is the same for both filter, otherwise the estimate of the direction will be biased because the average intensity may be different from one channel to another.

Here is a visualization of that property with filters of size 5, applied to a green pixel:

$$K_x^{(b)} = \begin{bmatrix} -1 & -1 & 0 & 1 & 1 \\ -1 & -1 & 0 & 1 & 1 \\ -1 & -1 & 0 & 1 & 1 \\ -1 & -1 & 0 & 1 & 1 \\ -1 & -1 & 0 & 1 & 1 \end{bmatrix}$$

$$K_y^{(b)} = \begin{bmatrix} -1 & -1 & -1 & -1 & -1 \\ -1 & -1 & -1 & -1 & -1 \\ 0 & 0 & 0 & 0 & 0 \\ 1 & 1 & 1 & 1 & 1 \\ 1 & 1 & 1 & 1 & 1 \end{bmatrix}$$

$$K_x = \begin{bmatrix} -1 & -1 & 0 & 1 & 1 \\ -1 & -1 & 0 & 1 & 1 \\ -1 & 0 & 0 & 0 & 1 \\ -1 & -1 & 0 & 1 & 1 \\ -1 & -1 & 0 & 1 & 1 \end{bmatrix}$$

$$K_y = \begin{bmatrix} -1 & -1 & -1 & -1 & -1 \\ -1 & -1 & 0 & -1 & -1 \\ 0 & 0 & 0 & 0 & 0 \\ 1 & 1 & 0 & 1 & 1 \\ 1 & 1 & 1 & 1 & 1 \end{bmatrix}$$

Here $K_x^b$ put non-zero weight to 4 blue pixels and 6 red pixels while $K_y$ put non-zero weight to 6 blue pixels and 4 red pixels. With $K_x$ and $K_y$ for any color channel the number of pixels with non zero weight is consistent between the two filters. Finally we do not need to put every other coefficient to zero in the diagonals of $K_w$ and $K_z$ because they readily satisfy the property that for each color channel the number of pixels with non-zero weight is the same for both filter. Moreover, the fact that $K_x$ and $K_y$ on one hand and $K_w$ and $K_z$ on the other hand put non-zero weight to a different number of pixels for some color channel does not matter. The reason is that their respective estimates $g_{xy}$ and $9_{zw}$ are first normalized before being aggregated.

5.2. Computation of the Blurred Edge Denoised Value z

The blurred edge denoised value z at pixel p is the result of a 1D Gaussian filter centered on p using neighboring pixels projected to the normal to the edge. More precisely the formula to compute z is:

$$z = \frac{1}{C(p)} \sum_{x=-k}^{k} \sum_{y=-k}^{k} I(p + 2(x, y)) w_e(p, x, y)$$

with $$C(p) = \sum_{x=-k}^{k} \sum_{y=-k}^{k} w_e(p, x, y)$$

and with $$w_e(p, x, y) = \exp\left(\frac{-(xu_x + yu_y)^2}{2\sigma^2}\right)$$

where $(u_x, u_y) = u$ is the normal to the edge at pixel p estimated previously. The term $(xu_x + yu_y)^2$ is the square of the distance between point $p+2(x,y)$ and the edge. The size of the support of the filter is $4k+1$, k is chosen depending on the desired amount of denoising and the computational budget. When k is larger the denoising is stronger but can accommodate only less curved edges and it requires more computations.

5.3. Computation of the blurred edge denoised shifted values $$z_{-}$$

and $$z_{+}$$

The formulas to compute $$z_{-}$$

and $$z_{+}$$

are:

$$z_- = \frac{1}{C_-(p)} \sum_{x=-k}^{k} \sum_{y=-k}^{k} I(p + 2(x, y)) w_-(p, x, y)$$

with $$C_-(p) = \sum_{x=-k}^{k} \sum_{y=-k}^{k} w_-(p, x, y)$$

$$z_+ = \frac{1}{C_+(p)} \sum_{x=-k}^{k} \sum_{y=-k}^{k} I(p + 2(x, y)) w_+(p, x, y)$$

with $$C_+(p) = \sum_{x=-k}^{k} \sum_{y=-k}^{k} w_+(p, x, y)$$

$$w_-(p, x, y) = \exp\left(\frac{-(xu_x + yu_y - h)^2}{2\sigma^2}\right)$$

and and with $$w_+(p, x, y) = \exp\left(\frac{-(xu_x + yu_y + h)^2}{2\sigma^2}\right).$$

The term $(xu_x + yu_y - h)^2$ is the square of the distance between the point $p+2(x,y)$ and the line parallel to the edge at a distance h on the side of the edge that has the brighter pixels.

The term $(xu_x + yu_y + h)^2$ is the square of the distance between the point $p+2(x,y)$ and the line parallel to the edge at a distance h on the side of the edge that has the darker pixels.

5.4. Blending with the Result of the Texture Preserving Raw Image Denoiser

The following is a description of the functions of the Blending Module 222 shown in FIG. 2.

Denoting $\hat{I}(p)$ the result of the texture preserving denoiser and $\tilde{I}(p)$ the result of the edge denoiser, the final estimate of the denoised image is:

$$\hat{I}(p)=w_b(p)\tilde{I}(p)+(1-w_b(p))\hat{I}(p)$$

where is a blending weight at each pixel p which is computed automatically the following way.

$$w_b(p)=(1-sig(\alpha(p),\mu_a))(1-sig(m(p),\mu_g))$$

sig is the following sigmoid function:

$$sig(x,\mu)=0.5\tanh\left(4\frac{x-\mu}{\min(|\mu|,\epsilon)}\right)$$

where $\epsilon$ is some small value to avoid division by 0.

The constants $\mu_a$ and $\mu_g$ are parameters to tune to obtain best blending results. Typical values are $\mu_a \in [5,15]$ and $\mu_g = 1.3$.

The function $\alpha(p)$ measures the variability in a small neighborhood of $\rho$ of the direction of u, the normal to the edge, as estimated previously. The function m(p) measures how much the neighborhood of $\rho$ is similar to a patch with a strong edge separating two flat areas. It does this by estimating the absolute value of the derivatives along many different directions and taking the minimum of those. Both $\alpha(p)$ and m(p) tend to be high when p is not close to an edge and are close to zero when p is close to a strong edge. This makes $w_b(p)$ close to 0 when p is not close to an edge and close to 0 when p is close to a strong edge if $\mu_0$ and $\mu_g$ are well chosen.

We now give details about how to compute $\alpha(p)$ and m(p)

5.4.1. Computation of $\alpha(p)$

We introduce the following notations: N (p)={p+(x,y); x, y∈{-2, 0, 2}} a neighborhood of p that includes p and 8 other nearby pixels of the same Bayer channel, and $\Theta(p)$=angle(u) the angle of the normal to the edge at p. For $q,q' \in N(p)$ we define $\delta(q,q')=(\theta(q)-\theta(q'))\equiv\pi$ where the symbol ≡ means modulo. Then $$\alpha(p)=\frac{180}{\pi}\min_{q,q'\in N(p)}\alpha(q,q')$$

where $\alpha(q,q')=\min(\delta(q,q'),\pi-\delta(q,q'))$. The scaling by $$\frac{180}{\pi}$$

is optional, it is useful to be able to express $\mu_a$ in degrees.

5.4.2. Computation of m(p)

We present two methods to compute m(p). The first method is based on filters with small support which is advantageous when using line buffer architectures, but that method can become inaccurate in case of very sharp images. For such cases we present a second method based on filters with larger support.

5.4.2.1. Method 1: Small Support Filters

We first define $g_x$ and $g_y$ as the convolutions of the input raw image I with kernels $k_x$=(-1 0 1) and $k_y=k_x^T$ respectively. Then for any $\theta \in [0,\pi]$ and pixel p in the image, we define $g(p,\theta)=|g_x(p)\cos\theta+g_y(p)\sin\theta|$ and $$\bar{g}(p,\theta)=\frac{1}{|B(p)|}\sum_{q\in B(p)}g(q,\theta)$$

where B (p) is a neighborhood of p, for instance all pixels in a patch of M by M pixels centered at p. Then m(p) is defined as follows:

$$m(p)=\min_{k\in\{1,\ldots,N\}}\bar{g}\left(p,\frac{k}{N}\pi\right)$$

where N is chosen such as making the filter effective enough at measuring the similarity of the patch with a strong edge, while still being acceptable in terms of amount of computation.

5.4.2.2. Method 2: Large Support Filters

We first define a collection of 16 filters K={$k_i$; i∈{1, ..., 16}} as follows.

$$k_1=(-1\ 0\ 1), k_2=k_1^T, k_3=\begin{pmatrix}-1&0&0\\0&0&0\\0&0&1\end{pmatrix}, k_4=\begin{pmatrix}0&0&1\\0&0&0\\-1&0&0\end{pmatrix}$$

$$k_5=\begin{pmatrix}-1&0&0&0&0\\0&0&0&0&0\\0&0&0&0&1\end{pmatrix}, k_6=k_5^T,$$

$$k_7=\begin{pmatrix}0&0&0&0&1\\0&0&0&0&0\\-1&0&0&0&0\end{pmatrix}, k_8=k_7^T$$

$$k_9=0.25\begin{pmatrix}-3&0&0&0&1\\0&0&0&0&0\\-1&0&0&0&3\end{pmatrix}, k_{10}=k_9^T,$$

$$k_{11}=0.25\begin{pmatrix}-1&0&0&0&3\\0&0&0&0&0\\-3&0&0&0&1\end{pmatrix}, k_{12}=k_{11}^T$$

$$k_{13}=0.25\begin{pmatrix}-3&0&-1&0&0\\0&0&0&0&0\\0&0&0&0&0\\0&0&0&0&0\\0&0&1&0&3\end{pmatrix}, k_{14}=k_{13}^T,$$

$$k_{15}=0.25\begin{pmatrix}0&0&-1&0&-3\\0&0&0&0&0\\0&0&0&0&0\\0&0&0&0&0\\3&0&1&0&0\end{pmatrix}, k_{16}=k_{15}^T.$$

Then for each k∈K we define $g_k$ as the convolution of the input raw image I with kernel k, and $$\bar{g}_k(p)=\frac{1}{|B(p)|}\sum_{q\in B(p)}|g_k(q)|$$

where B(p) is a neighborhood of p as previously. Then m(p) is defined as follows:

$$m(p) = \min_{k \in K} \bar{g}_k(p).$$

6.0 Modifications/Variations

The systems 100 and 100 of the embodiments of the invention, comprising all modules and devices as described with regard to FIGS. 1, 2, 4 and 5 include memory devices having computer readable instructions stored therein, for execution by at least one hardware processor.

It should be noted that image input data and image output data of the system and method of the embodiments of the present invention described herein are not, in any sense, abstract or intangible.

Instead, the data is necessarily digitally encoded and stored in a physical data-storage computer-readable non-transitory storage medium, such as an electronic memory, mass-storage device, or other physical, tangible, data-storage device and medium.

It should also be noted that the currently described data-processing and data-storage methods cannot be carried out manually by a human analyst, because of the complexity and vast numbers of intermediate results generated for processing and analysis of even quite modest amounts of data.

Instead, the methods described herein are necessarily carried out by electronic computing systems on electronically or magnetically stored data, with the results of the data processing and data analysis digitally encoded and stored in one or more tangible, physical, data-storage devices and media.

In the method and system for denoising of a digital image, a bilateral filter, which does not use a guide but instead uses the image itself for computing the weights, may be used instead of non local means filter. However, the bilateral filter usually yields inferior results compared with the non local means filter for denoising applications.

The raw image format of the embodiments of the invention has been acquired using a Bayer's filter, however it is understood that any other raw image format of existing manufacturers of digital equipment may be also used, such as CYGM (cyan, yellow, green, magenta) filter, RGBE (red, green, blue, emerald) filter, panchromatic cell filters of various configurations, including CMYW (cyan, magenta, yellow, and white) filter, RGBW (red, green, blue, white) filter and other panchromatic filters; Fuji film "EXR" color filter array, Fuji film "X-Trans" color filter or else.

Although a single hardware processor 102 has been shown in FIG. 1 and a single hardware processor has been shown in FIG. 4, it is understood that the processing of images according to the embodiments of the present invention may be performed by multiple processors or cores, either sequentially or in parallel. Also certain parts of the processing or the entire processing may be done in a cloud, if required.

The method for demosaic artifact suppression of the present invention may be generalized for images with arbitrary set of channels, for instance: red, green, blue, and infrared. To do so, we need to perform the weighted average for each of the considered channels in the set of channels, as we presented for the R, G, and B channels above.

The method for demosaic artifact suppression of the present invention may be also generalized for other color filter array (CFA) patterns. For example, the vector Z(p) at pixel p may be computed in the following way. On each sub-set of pixels that has the same shape as the CFA pattern and that contains the pixel p, we compute the average luminance on that set. Those averages form the components of the vector Z(p).

Methods of the embodiment of the invention may be performed using one or more hardware processors, executing processor-executable instructions causing the hardware processors to implement the processes described above. Computer executable instructions may be stored in processor-readable storage media such as floppy disks, hard disks, optical disks, Flash ROMs (read only memories), non-volatile ROM, and RAM (random access memory). A variety of processors, such as microprocessors, digital signal processors, and gate arrays, may be employed.

Systems of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the methods of this disclosure.

It should be noted that methods and systems of the embodiments of the invention and data streams described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method for processing a raw digital image, comprising:
employing a hardware processor to perform:
denoising the raw digital image, comprising:
(a) selecting a first pixel (p) of the raw digital image;
(b) selecting a second pixel (q) of the raw digital image;
(c) determining a first plurality of pixel patches, each pixel patch in the first plurality of pixel patches having a predetermined pixel patch shape and a predetermined pixel patch size and containing the first pixel (p);
(d) determining a second plurality of pixel patches, each pixel patch in the second plurality of pixel patches containing the second pixel (q), and corresponding in shape and size to a respective pixel patch of the first plurality of pixel patches;

(e) determining a patch distance between each pair of corresponding pixel patches in the first plurality of pixel patches and the second plurality of pixel patches;

(f) determining an effective distance between the first pixel (p) and the second pixel (q) based on determined patch distances for all pairs of corresponding pixel patches in the first plurality of pixel patches and the second plurality of pixel patches;

(g) repeating the steps (a) to (f) for the same first pixel (p) and other second pixels (q) until a predetermined number of second pixels (q) in the raw digital image is processed; and (h) denoising the first pixel (p), comprising determining respective contributions of the second pixels (q) into a noise reduction of the first pixel (p), using respective effective distances of the second pixels (q); and removing high frequency artifacts from the first pixel (p), comprising:

determining an average for each pixel patch in the first plurality of pixel patches;

forming a multi-dimensional guide for the first pixel (p), comprising the average for the pixel patches as components of the multi-dimensional guide; and applying a Bilateral Filter method with the multi-dimensional guide to the first pixel (p), thereby denoising and removing the high frequency artifacts.

2. The method of claim 1, comprising repeating the steps (a) to (h) for other first pixels (p) until a predetermined number of first pixels (p) in the raw digital image is processed, thereby obtaining a denoised raw digital image.

3. The method of claim 2, wherein:
the predetermined number of the second pixels (q) comprises all pixels (q) in the raw digital image outside of the first plurality of pixel patches; and
the predetermined number of the first pixels (p) comprises all pixels (p) in the raw digital image outside of the second plurality of pixel patches.

4. The method of claim 1, wherein the predetermined pixel patch shape is one of the following:
a square;
a rectangle;
a circle;
an oval;
a hexagon;
an octagon; or
a polygon.

5. The method of claim 1, wherein the predetermined pixel patch shape is a square, and a predetermined pixel patch size is from 2×2 pixels to 3×3 pixels.

6. The method of claim 1, wherein the predetermined pixel patch shape is a square, and a predetermined pixel patch size is from about 2×2 pixels to about 8×8 pixels.

7. The method of claim 1, wherein the predetermined pixel patch shape is a square, and a predetermined pixel patch size is from about 5×5 pixels to about 16×16 pixels.

8. The method of claim 1, wherein the step (f) comprises determining the effective distance as an average patch distance among all patch distances.

9. The method of claim 1, wherein the step (f) comprises determining the effective distance as a maximum patch distance among all patch distances.

10. The method of claim 1, wherein the step of denoising (h) comprises applying one of:
a Non-Local Means method; or
a Bilateral Filter method.

11. The method of claim 1, wherein:
the predetermined shape of the pixel patch is a rectangle;
a neighborhood of pixels surrounding the first pixel (p) used for denoising the first pixel (p) has a rectangular shape; and
the step (h) of denoising comprising comprises applying an integral images method.

12. The method of claim 1, wherein the raw digital image is a Bayer's pattern image.

13. The method of claim 1, wherein the steps (a) and (b) comprise selecting the first and second pixels of a same type.

14. A system for processing a raw digital image, comprising:
a processor and a non-transitory computer readable storage medium having computer readable instructions stored thereon for execution by the processor, causing the processor to:
denoise the raw digital image, causing the processor to:
(a) select a first pixel (p) of the raw digital image;
(b) select a second pixel (q) of the raw digital image;
(c) determine a first plurality of pixel patches, each pixel patch in the first plurality of pixel patches having a predetermined pixel patch shape and a predetermined pixel patch size and containing the first pixel (p);
(d) determine a second plurality of pixel patches, each pixel patch in the second plurality of pixel patches containing the second pixel (q), and corresponding in shape and size to a respective pixel patch of the first plurality of pixel patches;
(e) determine a patch distance between each pair of corresponding pixel patches in the first plurality of pixel patches and the second plurality of pixel patches;
(f) determine an effective distance between the first pixel (p) and the second pixel (q) based on determined patch distances for all pairs of corresponding pixel patches in the first plurality of pixel patches and the second plurality of pixel patches;
(g) repeat the steps (a) to (f) for the same first pixel (p) and other second pixels (q) until a predetermined number of second pixels (q) in the raw digital image is processed; and
(h) denoise the first pixel (p), comprising determining respective contributions of the second pixels (q) into a noise reduction of the first pixel (p), using respective effective distances of the second pixels (q); and
remove high frequency artifacts from the first pixel (p), causing the processor to:
determine an average for each pixel patch in the first plurality of pixel patches;
form a multi-dimensional guide for the first pixel (p), comprising the average for the pixel patches as components of the multi-dimensional guide; and
apply a Bilateral Filter method with the multi-dimensional guide to the first pixel (p), thereby denoising and removing the high frequency artifacts.

15. The system of claim 14, wherein the instructions cause the processor to repeat the steps (a) to (h) for other first pixels (p) until a predetermined number of first pixels (p) in the raw digital image is processed, thereby obtaining a denoised raw digital image.

16. The system of claim 15, wherein:
the predetermined number of second pixels (q) comprises all pixels (q) in the raw digital image outside of the first plurality of pixel patches; and the predetermined number of first pixels (p) comprises all pixels (p) in the raw digital image outside of the second plurality of pixel patches.

17. The system of claim 14, wherein the predetermined pixel patch shape is one of the following:
   a square;
   a rectangle;
   a circle;
   an oval;
   a hexagon;
   an octagon; or
   a polygon.

18. The system of claim 14, wherein the predetermined pixel patch shape is a square, and a predetermined pixel patch size is from 2×2 pixels to 3×3 pixels.

19. The system of claim 14, wherein the predetermined pixel patch shape is a square, and a predetermined pixel patch size is from about 2×2 pixels to about 8×8 pixels.

20. The system of claim 14, wherein the predetermined pixel patch shape is a square, and a predetermined pixel patch size is from about 5×5 pixels to about 16×16 pixels.

21. The system of claim 14, wherein the step (f) comprises determining the effective distance as an average patch distance among all patch distances.

22. The system of claim 14, wherein the step (f) comprises determining the effective distance as a maximum patch distance among all patch distances.

23. The system of claim 14, wherein the instructions to denoise the first pixel further cause the processor to apply one of:
   a Non-Local Means method; or
   a Bilateral Filter method.

24. The system of claim 14, wherein:
   the predetermined shape of the pixel patch is a rectangle;
   a neighborhood of pixels surrounding the first pixel (p) used for denoising the first pixel (p) has a rectangular shape; and
   the instructions to denoise the first pixel comprise applying an integral images method.

25. The system of claim 14, wherein the raw digital image is a Bayer's pattern image.

26. The system of claim 14, wherein the instructions cause the processor to select the first and second pixels of a same type in steps (a) and (b).

* * * * *

UNITED STATES PATENT AND TRADEMARK OFFICE
CERTIFICATE OF CORRECTION

PATENT NO. : 10,223,772 B2
APPLICATION NO. : 15/466639
DATED : March 5, 2019
INVENTOR(S) : Emmanuel Onzon et al.

Page 1 of 1

It is certified that error appears in the above-identified patent and that said Letters Patent is hereby corrected as shown below:

In the Drawings

In FIG. 1, box 102, "IMGAGE" is replaced with --IMAGE--;

In FIG. 4, box 102, "IMGAGE" is replaced with --IMAGE--; and

In FIG. 6, box 604, "SEELCT" is replaced with --SELECT--; and

In FIG. 6, box 612, "DIMENSIOANL" is replaced with --DIMENSIONAL--.

Signed and Sealed this
Fourth Day of June, 2019

Andrei Iancu
*Director of the United States Patent and Trademark Office*